US007328401B2

(12) United States Patent
Obata et al.

(10) Patent No.: US 7,328,401 B2
(45) Date of Patent: *Feb. 5, 2008

(54) ADAPTIVE WEB CRAWLING USING A STATISTICAL MODEL

(75) Inventors: Kenji C Obata, Berkeley, CA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

This patent is subject to a terminal disclaimer.

(21) Appl. No.: 11/022,054

(22) Filed: Dec. 22, 2004

(65) Prior Publication Data

US 2005/0165778 A1 Jul. 28, 2005

Related U.S. Application Data

(63) Continuation of application No. 09/493,748, filed on Jan. 28, 2000, now abandoned.

(51) Int. Cl.
*G06F 7/00* (2006.01)
*G06F 15/16* (2006.01)
*G06F 17/00* (2006.01)

(52) U.S. Cl. .................. 715/501.1; 715/500; 715/513; 709/203; 707/3

(58) Field of Classification Search ................ 715/500, 715/501.1, 513, 526; 707/1, 3, 200; 709/203
See application file for complete search history.

(56) References Cited

U.S. PATENT DOCUMENTS 5,606,609 A 2/1997 Houser et al.
6,032,196 A * 2/2000 Monier ....................... 709/245
6,070,191 A 5/2000 Narendran et al.

(Continued)

FOREIGN PATENT DOCUMENTS

JP 10091638 4/1998
JP 11328191 11/1999

OTHER PUBLICATIONS

S. Chakrabarti, "Recent results in automatic Web resource discovery," ACM Computing Surveys, vol. 31, No. 4es, Dec. 1999, pp. 1-7.*

(Continued)

*Primary Examiner*—William Bashore
*Assistant Examiner*—Maikhanh Nguyen
(74) *Attorney, Agent, or Firm*—Christensen O'Connor Johnson Kindness PLLC

(57) ABSTRACT

A computer based system and method of retrieving information pertaining to documents on a computer network is disclosed. The method includes selecting a set of documents to be accessed during a Web crawl by utilizing a statistical model to determine which previously retrieved documents are most likely to have changed since last accessed. The statistical model is continuously improving its accuracy by training internal probability distributions to reflect the actual experience with change rate patterns of the documents accessed. The decision made whether to access the document is based on the probability of change compared against a desired synchronization level, random selections, maximum limits on the amount of time since the document was last accessed, and other criterion. Once the decision to access is made, the document is checked for changes and this information is used to train the statistical model.

14 Claims, 26 Drawing Sheets

U.S. PATENT DOCUMENTS

| | | | |
|---|---|---|---|
| 6,098,064 A * | 8/2000 | Pirolli et al. | 707/2 |
| 6,145,003 A * | 11/2000 | Sanu et al. | 709/225 |
| 6,182,085 B1 * | 1/2001 | Eichstaedt et al. | 707/104.1 |
| 6,263,364 B1 | 7/2001 | Najork et al. | |
| 6,304,864 B1 | 10/2001 | Liddy et al. | |
| 6,351,467 B1 | 2/2002 | Dillon | |
| 6,351,755 B1 | 2/2002 | Najork et al. | |
| 6,360,215 B1 * | 3/2002 | Judd et al. | 707/3 |
| 6,418,433 B1 * | 7/2002 | Chakrabarti et al. | 707/5 |
| 6,539,376 B1 | 3/2003 | Sundaresan et al. | |
| 6,547,829 B1 | 4/2003 | Meyerzon et al. | |
| 6,549,897 B1 * | 4/2003 | Katariya et al. | 707/5 |
| 6,594,682 B2 * | 7/2003 | Peterson et al. | 718/102 |
| 6,598,051 B1 | 7/2003 | Weiner et al. | |
| 6,638,314 B1 * | 10/2003 | Meyerzon et al. | 715/513 |

OTHER PUBLICATIONS

Lam, et al., "Automatic Document Classification Based on Probabilistic Reasoning: Model and Performance Analysis," *IEEE*, 1997, pp. 2719-2723.

Lee, J.K.W., et al., "Intelligent Agents for Matching Information Providers and Consumers on the World-Wide-Web," *IEEE*, 1997, pp. 189-199.

Huang et al., "Design and Implementation of a Chinese full-text retrieval System Bsed on Probabilistic Model," *IEEE*, 1993, pp. 1090-1093.

Yuwono, Budi, and Dik L. Lee, "Search and Ranking Algorithms for Locating Resources on the World Wide Web," *IEEE*, 1996, pp. 164-170.

\* cited by examiner

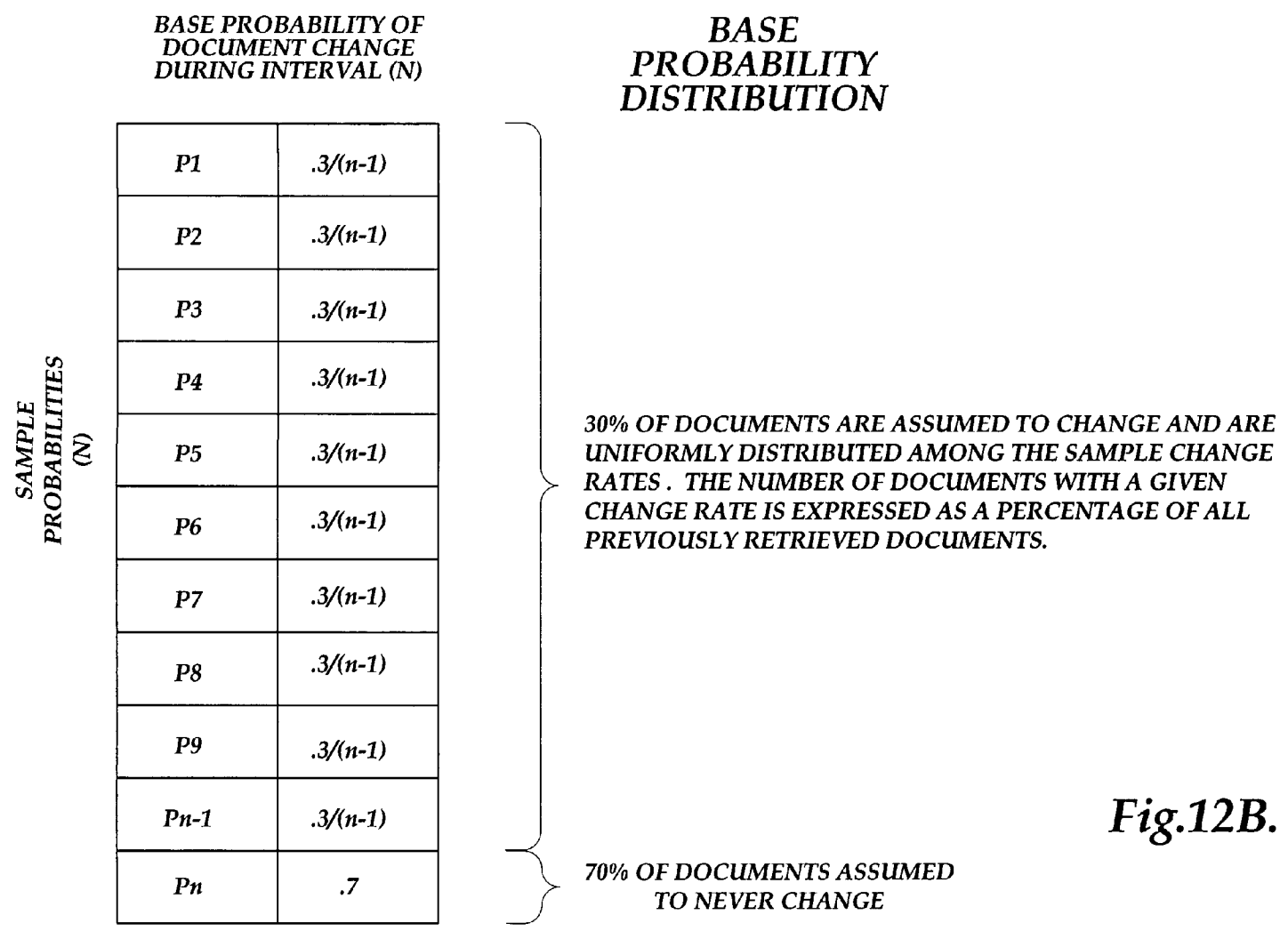

BASE PROBABILITY DISTRIBUTION

| BASE PROBABILITY OF DOCUMENT CHANGE DURING INTERVAL (N) | |
|---|---|
| P1 | .3/(n-1) |
| P2 | .3/(n-1) |
| P3 | .3/(n-1) |
| P4 | .3/(n-1) |
| P5 | .3/(n-1) |
| P6 | .3/(n-1) |
| P7 | .3/(n-1) |
| P8 | .3/(n-1) |
| P9 | .3/(n-1) |
| Pn-1 | .3/(n-1) |
| Pn | .7 |

SAMPLE PROBABILITIES (N)

30% OF DOCUMENTS ARE ASSUMED TO CHANGE AND ARE UNIFORMLY DISTRIBUTED AMONG THE SAMPLE CHANGE RATES. THE NUMBER OF DOCUMENTS WITH A GIVEN CHANGE RATE IS EXPRESSED AS A PERCENTAGE OF ALL PREVIOUSLY RETRIEVED DOCUMENTS.

70% OF DOCUMENTS ASSUMED TO NEVER CHANGE

*Fig.12B.*

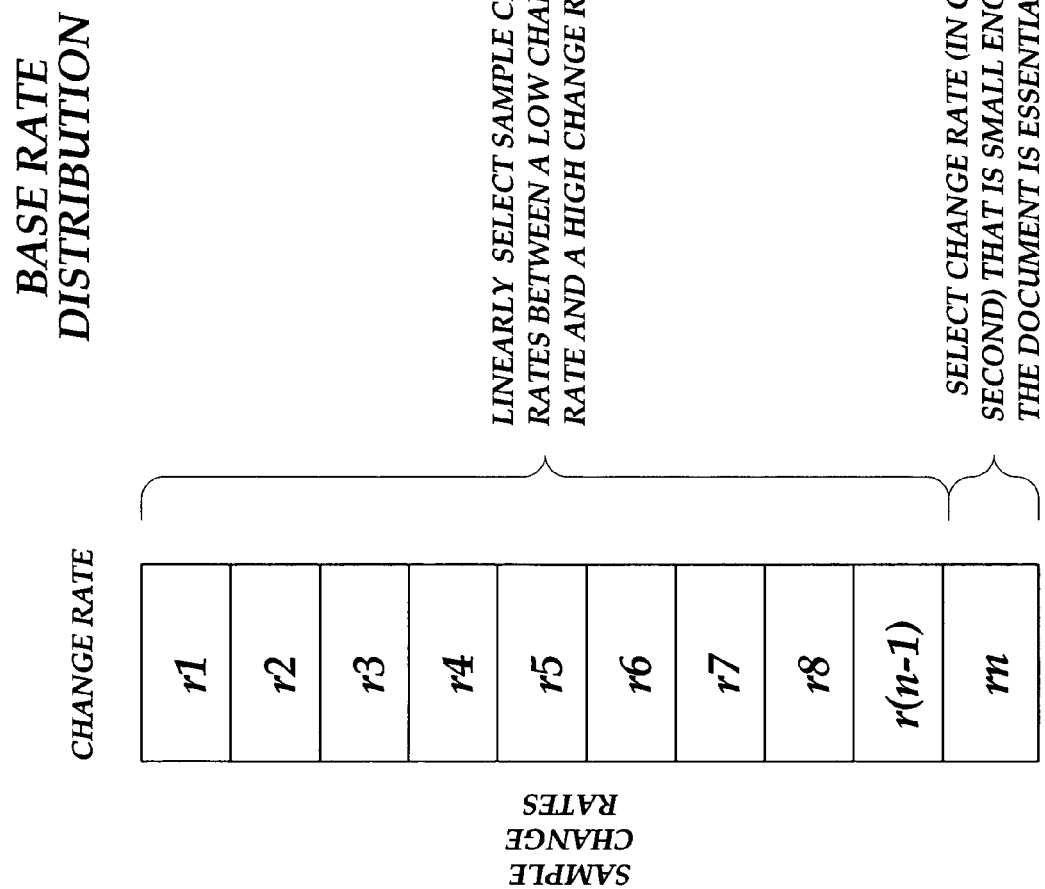

ADAPTIVE WEB CRAWLING USING A STATISTICAL MODEL

CROSS-REFERENCE TO RELATED APPLICATION

This application is a continuation of application Ser. No. 09/493,748, filed Jan. 28, 2000 now abandoned, the benefit of the filing date of which is hereby claimed under 35 U.S.C. § 120.

FIELD OF THE INVENTION

The present invention relates to the field of network information software and, in particular, to methods and systems for retrieving data from network sites.

BACKGROUND OF THE INVENTION

In recent years, there has been a tremendous proliferation of computers connected to a global network known as the Internet. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hyper Text Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites located around the world that maintain and distribute documents. The location of a document on the Web is typically identified by a document address specification commonly referred to as a Universal Resource Locator (URL). A Web site may use one or more Web server computers that store and distribute documents in one of a number of formats including the Hyper Text Markup Language (HTML). An HTML document contains text and metadata or commands providing formatting information. HTML documents also include embedded "links" that reference other data or documents located on any Web server computers. The referenced documents may represent text, graphics, or video in respective formats.

A Web browser is a client application or operating system utility that communicates with server computers via FTP, HTTP, and Gopher protocols. Web browsers receive documents from the network and present them to a user. Internet Explorer, available from Microsoft Corporation, of Redmond, Wash., is an example of a popular Web browser application.

An intranet is a local area network containing Web servers and client computers operating in a manner similar to the World Wide Web described above. Typically, all of the computers on an intranet are contained within a company or organization.

A Web crawler is a computer programs that automatically discovers and collects documents from one or more Web sites while conducting a Web crawl. The Web crawl begins by providing the Web crawler with a set of document addresses that act as seeds for the crawl and a set of crawl restriction rules that define the scope of the crawl. The Web crawler recursively gathers network addresses of linked documents referenced in the documents retrieved during the crawl. The Web crawler retrieves the document from a Web site, processes the received document data from the document and prepares the data to be subsequently processed by other programs. For example, a Web crawler may use the retrieved data to create an index of documents available over the Internet or an intranet. A "search engine" can later use the index to locate documents that satisfy a specified criteria.

Given the explosive growth in documents available on the World Wide Web, even the most efficient Web crawlers can visit only a small fraction of the documents available during any single crawl. Some documents on the Web will change over time with some documents changing more frequently than others. For instance, a document published on a Web site by a news organization may change several times an hour, a price list on a company's Web site may change once a year, and a document on a personal Web site may never change. Without regard to the likelihood that a previously visited document will have changed, in an effort to maintain data synchronization with the current contents of previously retrieved documents, Web crawlers will periodically revisit these previously retrieved documents to check for changes to their content.

It is desirable to have a mechanism by which a Web crawler can selectively access a previously retrieved document based in part on the probability that the document has actually changed in some substantive way since it was last accessed. Preferably, such a mechanism will make the decision to access or not to access a Web document without having to establish a connection with a host server that stores the original of the document. The mechanism would also preferably provide a way to continually improve the accuracy of its decisions to access or not to access documents based on the actual experience of the Web crawler as it tracks changed documents encountered during Web crawls. If a decision is made by the Web crawler to access a document, the mechanism should provide a way to quickly and accurately determine if the document has indeed changed. The present invention is directed to providing such a mechanism.

SUMMARY OF THE INVENTION

In accordance with one aspect of the invention, computer-based methods and systems for retrieving data from a computer network are provided. The methods and systems of the present invention optimize a Web crawler's use of computer resources when performing adaptive incremental Web crawls to maintain the synchronization between local data copied from a document when it was previously retrieved and current data contained in the document which may have been changed since the document was last retrieved. To intelligently determine which documents are most likely to have changed since a previous retrieval, the methods and systems of the present invention adaptively decide on whether or not to access a previously retrieved document during a current Web crawl based in part on a statistical model.

In accordance with other aspects of the invention, each Web crawl begins with an active probability distribution containing a plurality of probabilities indicative that a document has changed at a given change rate. A history map is maintained by the Web crawler that references a number of documents that were accessed during previous Web crawls.

For each referenced document in the history map, a document probability distribution is initialized as a copy of the active probability distribution. The document probability distribution is trained under a statistical model. The training is based on changes to the document experienced by the Web crawler during the previous Web crawls. A probability that the document has changed during an interval of interest is then computed based on the document probability distribution and the statistical model. A decision to access or not to access the document is made with the aid of this computed probability.

In accordance with additional aspects of the invention, the document probability distribution is trained for events as experienced with the document upon previous accesses. These events may include "change events" or "no change events." A change event may be where the document was found to have changed in some substantive manner since the last access of the document. A no change event may be where an access to the document determines that the document has not changed. A no change event determination may be made in many ways, such as by evaluating a time stamp associated with the document, or if no substantive change is found when a hash value of the currently retrieved document matches a hash value of the previously retrieved document. Events such as "no change chunk events" may also be interpolated from experienced events, as is described in detail below.

The probability that the document has changed (the "document change probability") is computed based on the document probability distribution. A bias is then computed based on the document change probability in conjunction with a synchronization level. The synchronization level may be a predefined value that specifies the percentage of documents that are expected to be synchronized at any given time. A decision whether to access the document is made based on a "coin-flip" using the computed bias.

In accordance with further aspects of the invention, the methods and systems of the present invention conserve computer resources by balancing the need for accuracy in the statistical model against the computer storage and computing resources available. In an actual embodiment of the invention, a minimal amount of historical information is maintained for each document in a history map. This historical information is converted by the method and systems of the present invention to interpolate change events, no change events, and no change chunk events by mapping data recorded in the history map to a timeline. From the interpolation, the variables required by the statistical model can be determined with reasonable accuracy, given the limited resources available to the Web crawler and the need for speedy processing when conducting a Web crawl.

In accordance with still further aspects of the invention, at the start of each adaptive incremental crawl a training probability distribution is initialized to essentially zero by multiplying a copy of a base probability distribution (containing a starting point estimate of probabilities that a document will change at a given change rate) by a small diversity factor. The training probability distribution recursively accumulates the document probability distribution for each document processed during the Web crawl. By summing each probability in the training probability distribution with a corresponding probability from each document probability distribution, the training probability distribution represents the accumulated experience-trained document probability distributions for all documents processed to that point in the current crawl. At the end of the current crawl, the training probability distribution is stored and used as the active probability distribution for the next crawl.

In accordance with other aspects of this invention, once the decision is made to access the document, a document address specification for that document is added to a transaction log. To process the transaction log, the Web crawler first retrieves a time stamp for the document from the location specified by the document address specification. That time stamp is compared with a time stamp associated with the version of the document previously retrieved (stored locally). If the respective time stamps match, the current document is considered to be unchanged, and is therefore not retrieved during the current Web crawl. Preferably, the time stamp comparison is performed by sending a request to a server to transfer the document only if the time stamp associated with the document at the server is more recent than a time stamp included in the request.

In accordance with other aspects of this invention, a secure hash function is used to determine a hash value corresponding to each previously retrieved document. The hash value is stored in a history map and is used in subsequent Web crawls to determine whether the corresponding current document is modified. A secure hash function may be used to obtain a new hash value, which is compared with the hash value for the previously retrieved document data. If the hash values are equal, the current document is considered to be substantively equivalent to the previously retrieved document data. If the hash values differ, the current document is considered to be modified and a change counter is incremented for the document. An access counter may also be incremented each time a network access is attempting on the current document, such as when the current document's timestamp is requested.

In accordance with further aspects of this invention, performing a Web crawl includes assigning a unique current crawl number to the Web crawl, and determining whether a currently retrieved document corresponding to each previously retrieved document copy is substantively equivalent to the corresponding previously retrieved document copy, in order to determine whether the document has been modified since a previous crawl. If the previously retrieved document is not substantively equivalent to the current document, and therefore has been modified, the document's associated crawl number modified is set to the current crawl number and stored in the index with the data from the previously retrieved document.

As will be readily appreciated from the foregoing description, a system and method formed in accordance with the invention for retrieving data from previously retrieved documents on a computer network provide an efficient way of retrieving and document data, wherein the retrieval of documents that have previously been retrieved is minimized. The invention allows a Web crawler to perform crawls in less time and to perform more comprehensive crawls. Assigning a crawl number modified to a retrieved document that is set to the current crawl number when the document has been retrieved and found to have been modified in some substantive way since the last time it was retrieved by the invention or if it is the first time the document is retrieved advantageously reduces search and document retrieval time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 12A-C illustrate the initialization of base distributions, in accordance with the invention;

FIGS. 16A-1 to A-2 are functional flow diagrams illustrating a process of training the document probability distribution, in accordance with an actual embodiment of the present invention;

FIGS. 16C-1 to C-2 are functional flow diagrams illustrating a process of training the document probability distribution for each experienced or interpolated event, in accordance with an actual embodiment of the present invention;

DETAILED DESCRIPTION OF THE PREFERRED EMBODIMENT

Figure 1:
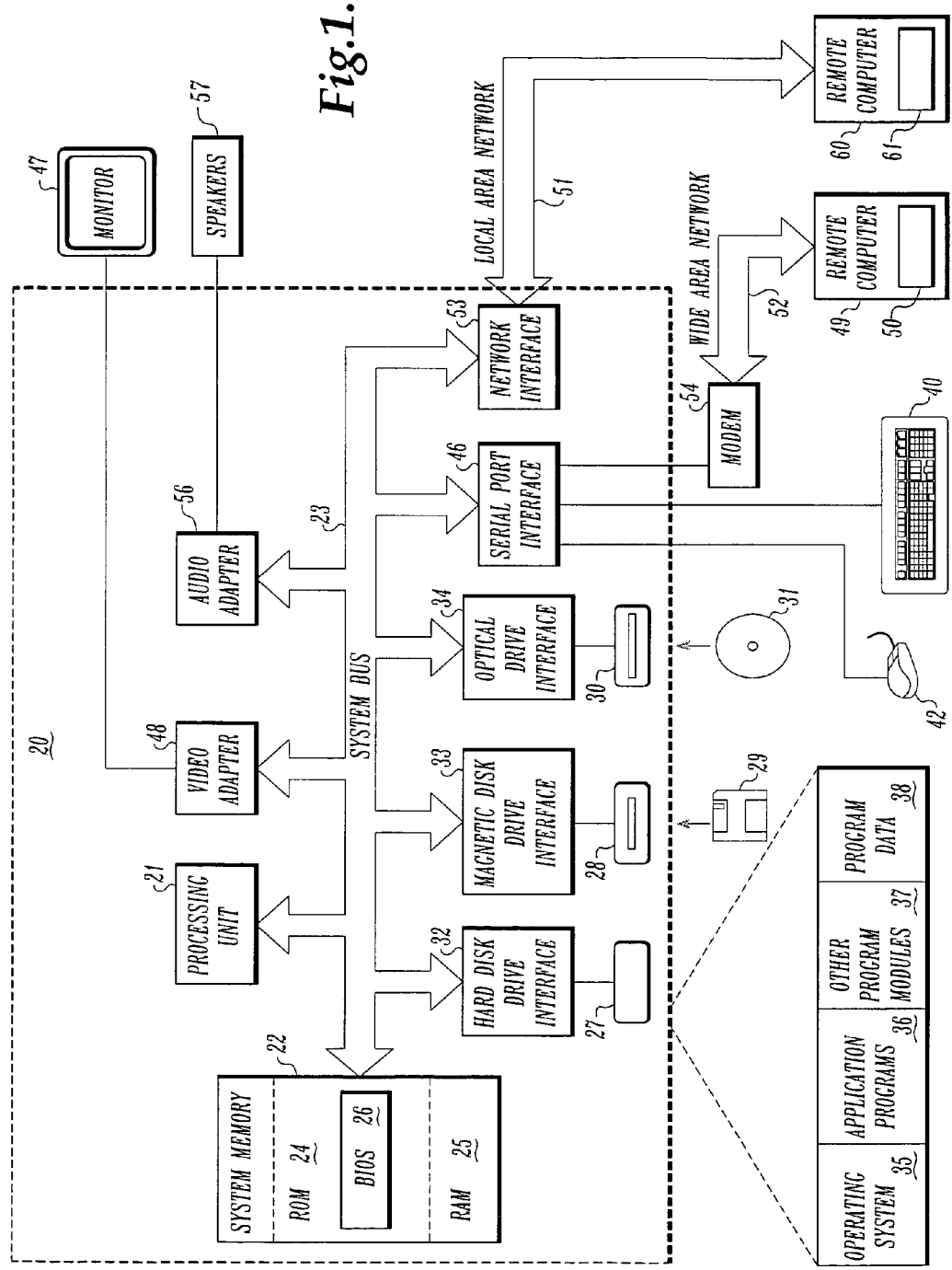
FIG. 1 is a block diagram of a general purpose computer system for implementing the present invention.

The present invention is a mechanism for obtaining information pertaining to documents that reside on one or more server computers. While the following discussion describes an actual embodiment of the invention that crawls the World Wide Web within the Internet, the present invention is not limited to that use. This present invention may also be employed on any type of computer network or individual computer having data stores such as files systems, e-mail messages and databases. The information from all of these different data stores can be processed by the invention together or separately. The present invention may also be used in any context in which it is desirable to maintain the synchronization of previously retrieved data with data as it may have been changed at its source. In addition to the application of the present invention in the Web crawler discussed below, another useful application of the present invention would be in a proxy server that stores local copies of documents that need to be "refreshed" at the proxy server when a source document changes.

A server computer hosts one or more Web sites and the process of locating and retrieving digital data from Web sites is referred to as "Web crawling." The mechanism of the invention initially performs a first full crawl wherein a transaction log is "seeded" with one or more document address specifications. A current document at each document address specification listed in the transaction log is retrieved from its Web site and processed. The processing includes extracting document data from each of these retrieved current documents and storing that document data in an index, or other database, with an associated crawl number modified that is set equal to a unique current crawl number that is associated with the first full crawl. A hash value for the document and the document's time stamp are also stored with the document data in the index. The document URL, its hash value, its time stamp, its crawl number modified and other historical information (discussed below) are stored in a persistent history map that is used by the crawler to record the documents that it has crawled.

Subsequent to the first full crawl, the invention can perform any number of full crawls or incremental crawls. During a full crawl, the transaction log is "seeded" with one or more document address specifications, which are used to retrieve the document associated with the document address specification. The retrieved documents are recursively processed to find any "linked" document address specifications contained in the retrieved document. The document address specification of the linked document is added to the transaction log the first time it is found during the current crawl. The full crawl builds a new index based on the documents that it retrieves based on the "seeds" in its transaction log and the project gathering rules that constrain the search. During the course of the full crawl, the document address specifications of the documents that are retrieved are compared to associated entries in the history map (if there is an entry), and a crawl number modified is assigned as is discussed in detail below.

An adaptive incremental crawl retrieves only documents that may have changed since the previous crawl. The adaptive incremental crawl uses the existing index and history map. The transaction log is selectively seeded with the document address specifications based on a decision whether or not to access a previously retrieved document that is made utilizing a statistical model, random selection and a selection based on the amount of time since the last access of the document. In an adaptive incremental crawl, once a decision is made to access a previously retrieved document, the document data is retrieved from a Web site if its time stamp is subsequent to the time stamp stored in the Web crawler's history map. In other words, during an adaptive incremental crawl, a document is preferably only retrieved from a Web site following an access to determine if the time stamp on the document on the Web site is different than the time stamp that was recorded in the history map for that URL. If the time stamp differs or is unavailable, the document is retrieved from the Web server.

When the document data is retrieved, the invention determines if an actual substantive change has been made to the previously retrieved document. This is done by filtering extraneous data from the document data (e.g., formatting information) and then computing a hash value for the retrieved document data. This newly computed hash value is then compared against the hash value stored in the history map for previously retrieved document data. Different hash values indicate that the content of the previously retrieved document has changed, resulting in the crawl number modified stored with the document data being reset to the current crawl number assigned to the Web crawl and a document change counter being incremented for that document in its associated history map entry.

Searches of the database created by the Web crawler can use the crawl number modified as a search parameter if a user is only interested in documents that have changed, or that have been added, since a previous search. Since the invention only changes the crawl number modified associated with the document when it is first retrieved, or when it has been retrieved and found to be modified, the user can search for only modified documents. In response to this request, the intermediate agent implicitly adds a limitation to the search that the search return only documents that have a crawl number modified that is subsequent to a stored crawl number associated with a prior search.

Web crawler programs execute on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAM), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 operates in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52. One example of such a wide area network 52 is the Internet.

When used in a local area networking environment, the personal computer 20 is connected to the local network 51 through a network interface or adapter 53. When used in a wide area networking environment, the personal computer 20 typically includes a modem 54 or other means for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
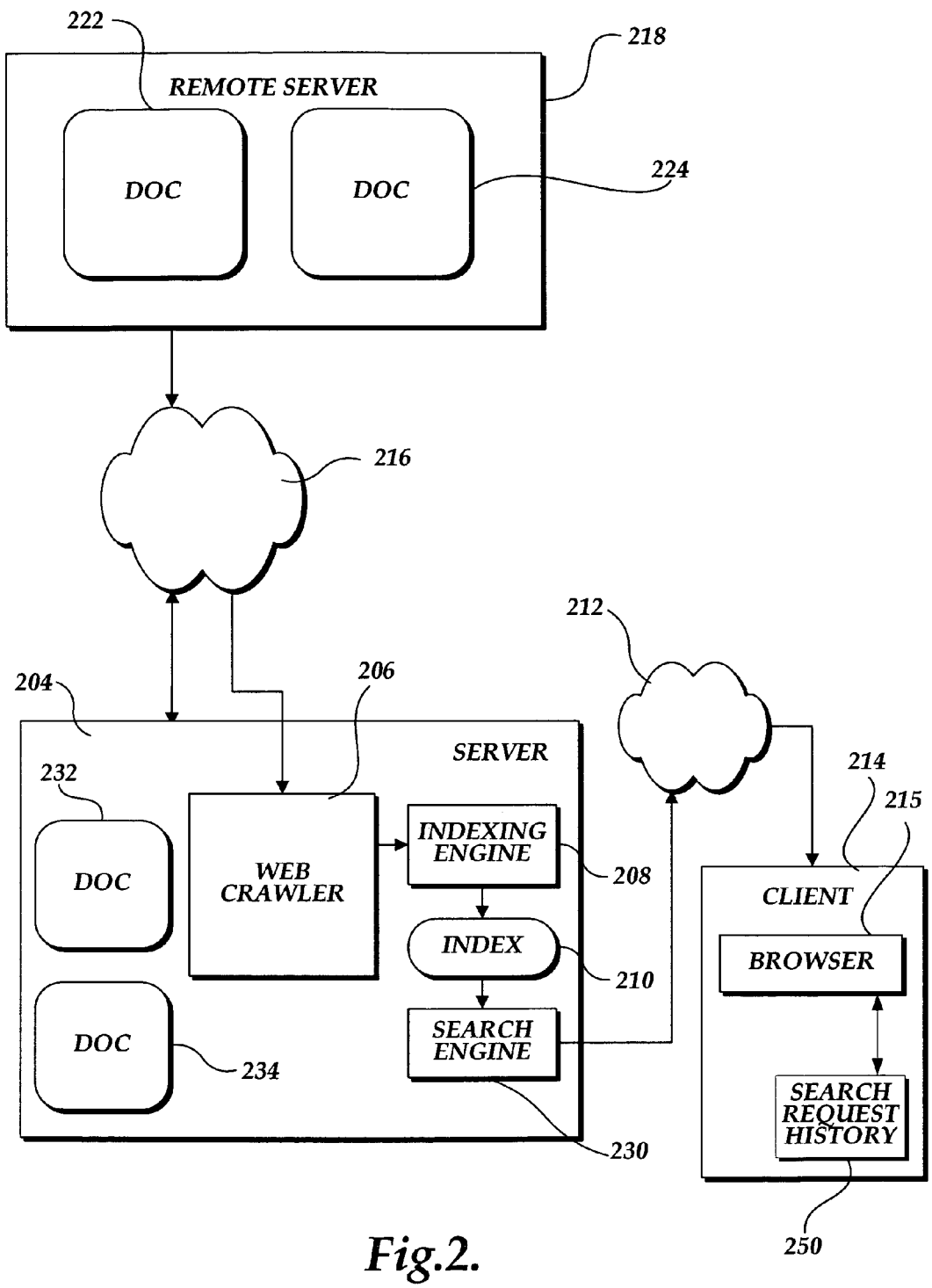
FIG. 2 is a block diagram illustrating a network architecture, in accordance with the present invention.

FIG. 2 illustrates an exemplary architecture of a networked system in which the present invention operates. A server computer 204 includes a Web crawler program 206 executing thereon. The Web crawler program 206 searches for documents distributed on one or more computers connected to a computer network 216, such as the remote server computer 218 depicted in FIG. 2. The computer network 216 may be a local area network 51 (FIG. 1), a wide area network 52, or a combination of networks that allow the server computer 204 to communicate with remote computers, such as the remote server computer 218, either directly or indirectly. The server computer 204 and the remote server computer 218 are preferably similar to the personal computer 20 depicted in FIG. 1 and discussed above.

The Web crawler program 206 searches ("crawls") remote server computers 218 connected to the network 216 for documents 222 and 224. The Web crawler 206 retrieves documents as document data. The document data from the documents 222 and 224 can be used in a variety of ways. For example, the Web crawler 206 may pass the document data to an indexing engine 208. An indexing engine 208 is a computer program that maintains an index 210 of documents. The type of information stored in the index depends upon the complexity of the indexing engine.

A client computer 214, such as the personal computer 20 (FIG. 1), is connected to the server computer 204 by a computer network 212. The computer network 212 may be a local area network, a wide area network, or a combination of networks. The computer network 212 may be the same network as the computer network 216 or a different network. The client computer 214 includes a computer program, such as a "browser" 215 that locates and displays documents to a user.

When a user at the client computer 214 desires to search for one or more documents, the client computer transmits a search request to a search engine 230. The search engine 230 examines its associated index 210 to find documents that may relate to the search request. The search engine 230 may then return a list of those documents to the browser 215 at the client computer 214. The user can examine the list of documents and retrieve one or more from remote computers such as the remote server computer 218.

As will be readily understood by those skilled in the art of computer network systems, and others, the system illustrated in FIG. 2 is exemplary, and alternative configurations may also be used in accordance with the invention. For example, the server computer 204 itself may include documents 232 and 234 that are accessed by the Web crawler program 206. Also the Web crawler program 206, the indexing engine 208, and the search engine 230 may reside on different computers. Additionally, the Web browser program and the Web crawler program 206 may reside on a single computer. Further, the indexing engine 208 and search engine 230 are not required by the present invention. The Web crawler program 206 may retrieve document information for use other than providing the information to a search engine. As discussed above, the client computer 214, the server computer 204, and the remote server computer 218 may communicate through any type of communication network or communications medium.

Figure 3:
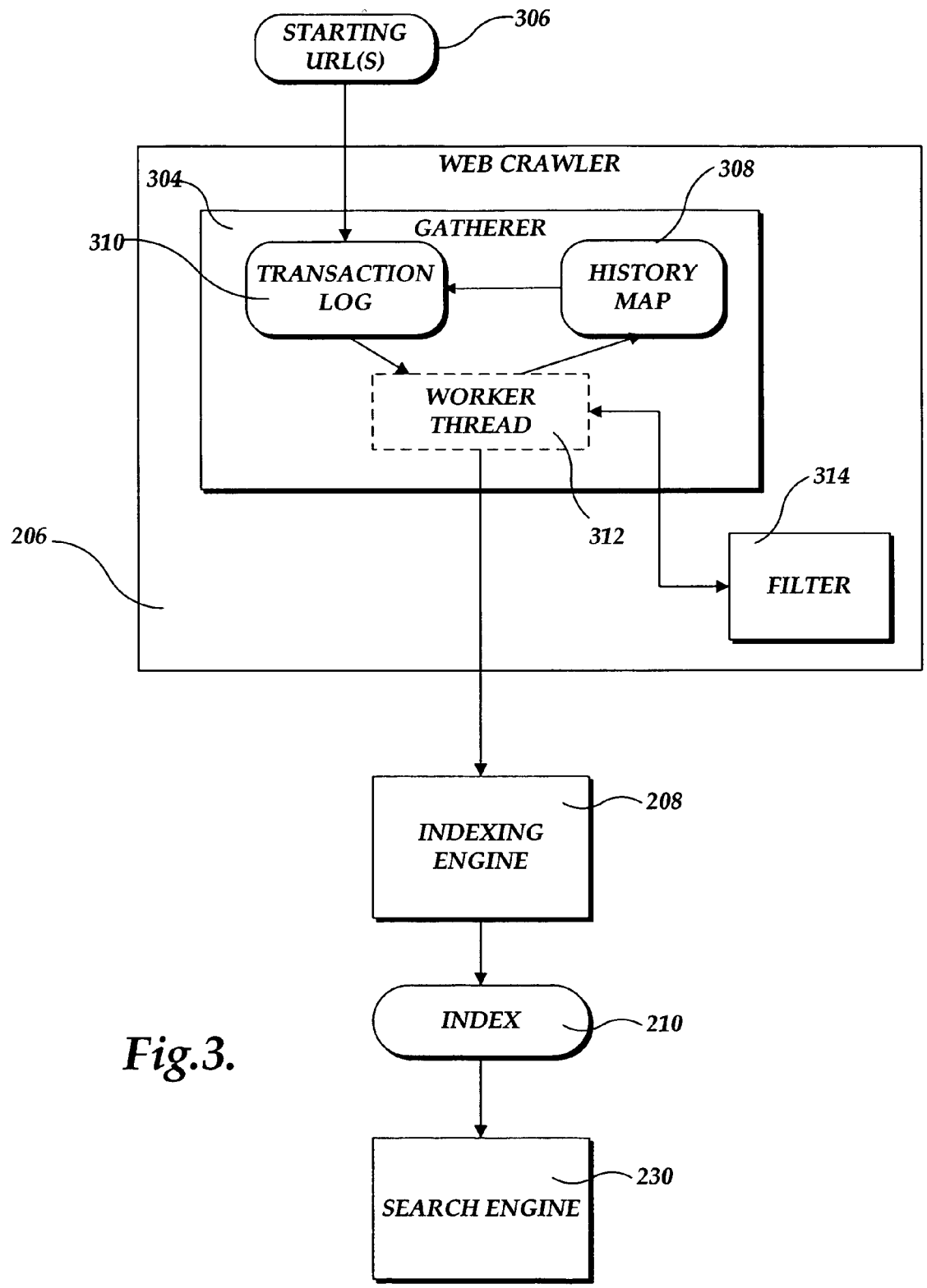
FIG. 3 is a block diagram illustrating some of the components used in the invention.

FIG. 3 illustrates, in further detail, the Web crawler program 206 and related software executing on the server computer 204 (FIG. 2). As illustrated in FIG. 3, the Web crawler program 206 includes a "gatherer" process 304 that crawls the Web and gathers information pertaining to documents. The gatherer process 304 is invoked by passing it one or more starting document address specifications, e.g., URLs 306. The starting URLs 306 serve as seeds, instructing the gatherer process 304 where to begin its Web crawling process. A starting URL can be a universal naming convention (UNC) directory, a UNC path to a file, or an HTTP path to a URL. The gatherer process 304 inserts the starting URLs 306 into a transaction log 310. The transaction log 310 identifies those documents that are to be crawled during the current crawl. Preferably, the transaction log 310 is implemented as a persistent queue that is written and kept in a nonvolatile storage device such as a disk 27. Preferably, the Web crawler 206 maintains a small in-memory cache of transactions in the transaction log 310 for quick access to the next transactions.

The gatherer process 304 also maintains a history map 308, which contains an ongoing list of all URLs and other historical information that have been accessed during the current Web crawl and previous crawls. The gatherer process 304 includes one or more worker threads 312 that process a URL until all the URLs in the transaction log 310 have been processed. The worker thread 312 retrieves a URL from the transaction log 310 and passes the URL to a filter daemon 314. The filter daemon 314 is a process that retrieves document data from the previously retrieved document at the address specified by the URL. The filter daemon 314 uses the access method specified by the URL to retrieve the document. The access method may be any file access method capable of allowing the filter daemon 314 to retrieve data, such as HTTP, File Transfer Protocol (FTP), file system commands associated with an operating system, or any other access protocol.

After retrieving a document, the filter daemon 314 parses the document and returns a list of text and properties. For example, an HTML document includes a sequence of properties or "tags," each containing some information. The information may be text to be displayed, "metadata" that describes the formatting of the text, hyperlinks, or other information. A hyperlink typically includes a document address specification. The Web browser program 215 uses the hyperlink to retrieve the information at the location in the document address specification. The information may be another document, a graphical image, and audio file, or the like.

Tags may also contain information intended for a search engine. For example, a tag may include a subject or category within which the document falls, to assist search engines that perform searches by subject or category. The information contained in tags is referred to as "properties" of the document. A document is therefore considered to be made up of a set of properties and text. The filter daemon 314 returns the list of properties and text to the worker thread 312.

Figure 4:
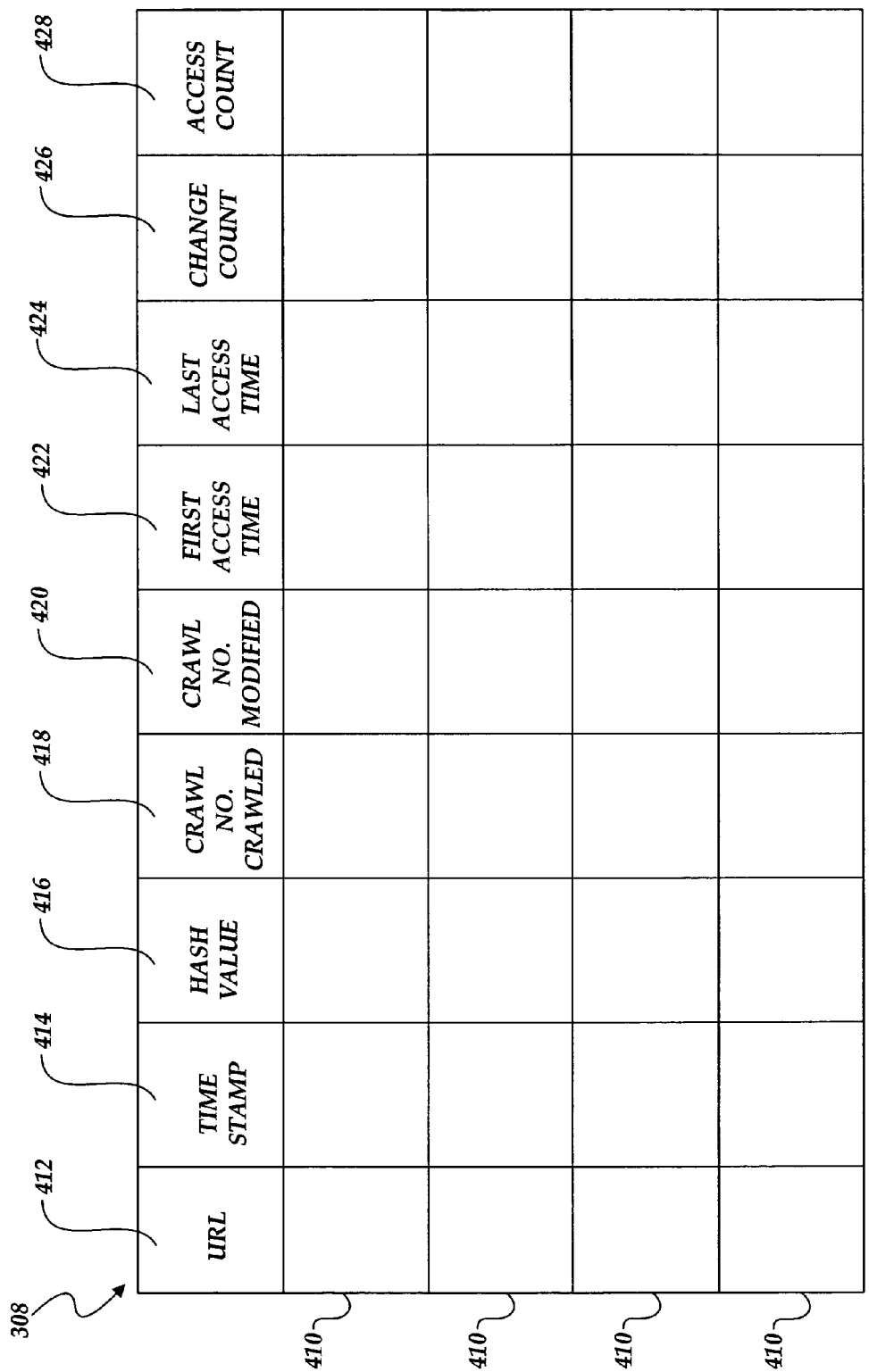
FIG. 4 illustrates an exemplary history map in accordance with the present invention.

The list of properties for a document includes a list of URLs that are included in hyperlinks within the document. The worker thread 312 passes this list of URLs to the history map 308. The history map 308 is illustrated in FIG. 4 and discussed below. Briefly stated, when a new or modified document is retrieved, the history map 308 checks each hyperlink URL to determine if it is already listed. URLs that are not already listed on the history map 308 are added and marked as not having been crawled during the current crawl. Use of the history map 308 allows the Web crawler 206 to avoid processing the same URL more than once during a crawl. The URLs that are not already listed on the history map 308 are also added to the transaction log 310, to be subsequently processed by a worker thread.

The worker thread 312 then passes the list of properties and text to the indexing engine 208. The indexing engine 208 creates an index 210, which is used by the search engine 230 in subsequent searches.

FIG. 4 illustrates an exemplary history map 308 in accordance with the present invention. Preferably, the history map 308 is stored in a nonvolatile memory so that it is persistent across multiple crawls and system shutdowns. As depicted, the history map 308 includes multiple entries 410, one entry corresponding to each URL 412. Each URL 412 specifies a document address specification associated with the corresponding document. The time stamp 414 that was associated with the corresponding document when the Web crawler last retrieved the document is stored in the history map 308.

The history map also includes a hash value 416 corresponding to each document identified in the history map. A hash value results from applying a "hash function" to the document. A hash function is a mathematical algorithm that transforms a digital document into a smaller representation of the document (called a "hash value"). A "secure hash function" is a hash function that is designed so that it is computationally unfeasible to find two different documents that "hash" to produce identical hash values. A hash value produced by a secure hash function serves as a "digital fingerprint" of the document. The "MD5" is one such secure hash function, published by RSA Laboratories of Redwood City, Calif. in a document entitled RFC 1321, suitable for use in conjunction with the present invention.

A history map entry 410 also includes crawl number crawled 418. The crawl number crawled 418 specifies the most recent crawl during which the corresponding URL was processed. As discussed below, the crawl number crawled 418 prevents duplicate processing of URLs during a crawl. When a crawl is completed, the crawl number crawled 418 corresponding to each entry in the history map 308 is equal to the current crawl number, unless the crawler did not find a link to the corresponding document.

The history map 410 also includes crawl number modified 420. A crawl number modified 420 specifies the most recent crawl number during which the corresponding document was determined to be modified. Unlike the crawl number crawled 418, the crawl number modified 420 is only set to the current crawl number when the document is found to have changed. The use of crawl numbers is explained in further detail below.

Historical information such as the first access time 422, the last access time 424, the change count 426, and the access count 428 are used in a statistical model for deciding if a document should be accessed during an adaptive incremental crawl, as is discussed below with reference to FIG. 8. The first access time 422 is set when the document is first accessed; the last access time 424 is set the most recent time that the document was accessed; the change count 426 is a counter that is incremented each time the document is discovered to have changed in a substantive way, and the access count 428 is a counter that is incremented each time an access is attempted for the document.

Figure 5:
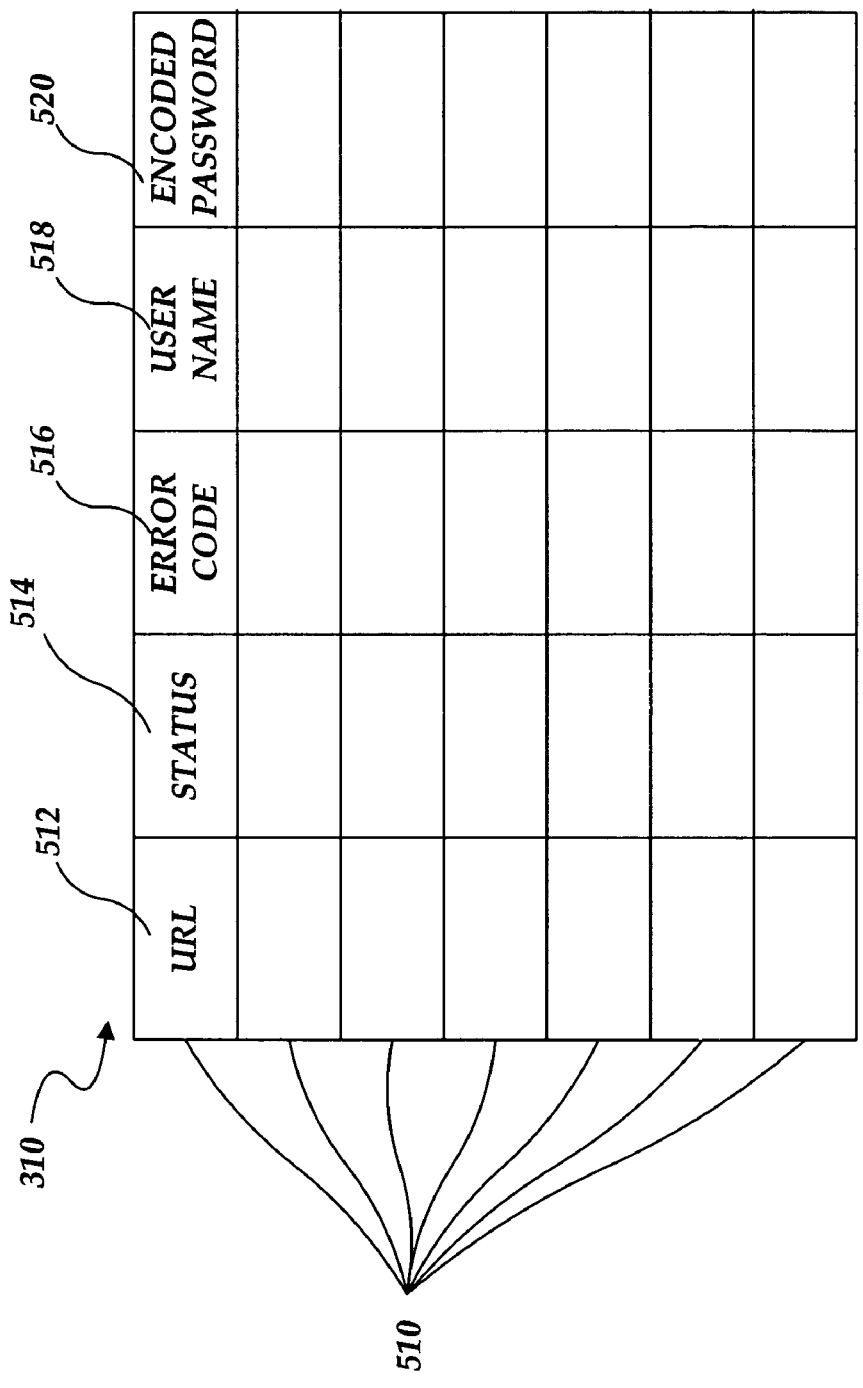
FIG. 5 illustrates an exemplary transaction log in accordance with the present invention.

An exemplary transaction log 310 is shown in FIG. 5. The transaction log 310 contains entries 510 that each represent a document to visit during the Web crawl. In an actual embodiment of the invention, each entry 510 in the transaction log 310 contains a URL 512 for the document to be processed, a status data 514 that is marked when the entry 510 is processed, an error code data 516 that indicates any errors encountered during processing, a user name data 518 and an encoded password data 520. The user name data 518 and the encoded password data 520 can be used during processing to access secure Web sites.

One skilled in the art will appreciate that additional fields can be added to the data entries 410 and 510, as may be required by the particular application of the invention. Populating the entries 510 of the transaction log is a recursive process. Inserting initial entries in the transaction log is referred to as "seeding" the transaction log 310. During processing, as new URLs are gathered from documents associated with the seeded entries, the new URLs are added to the transaction log 310.

Figure 7:
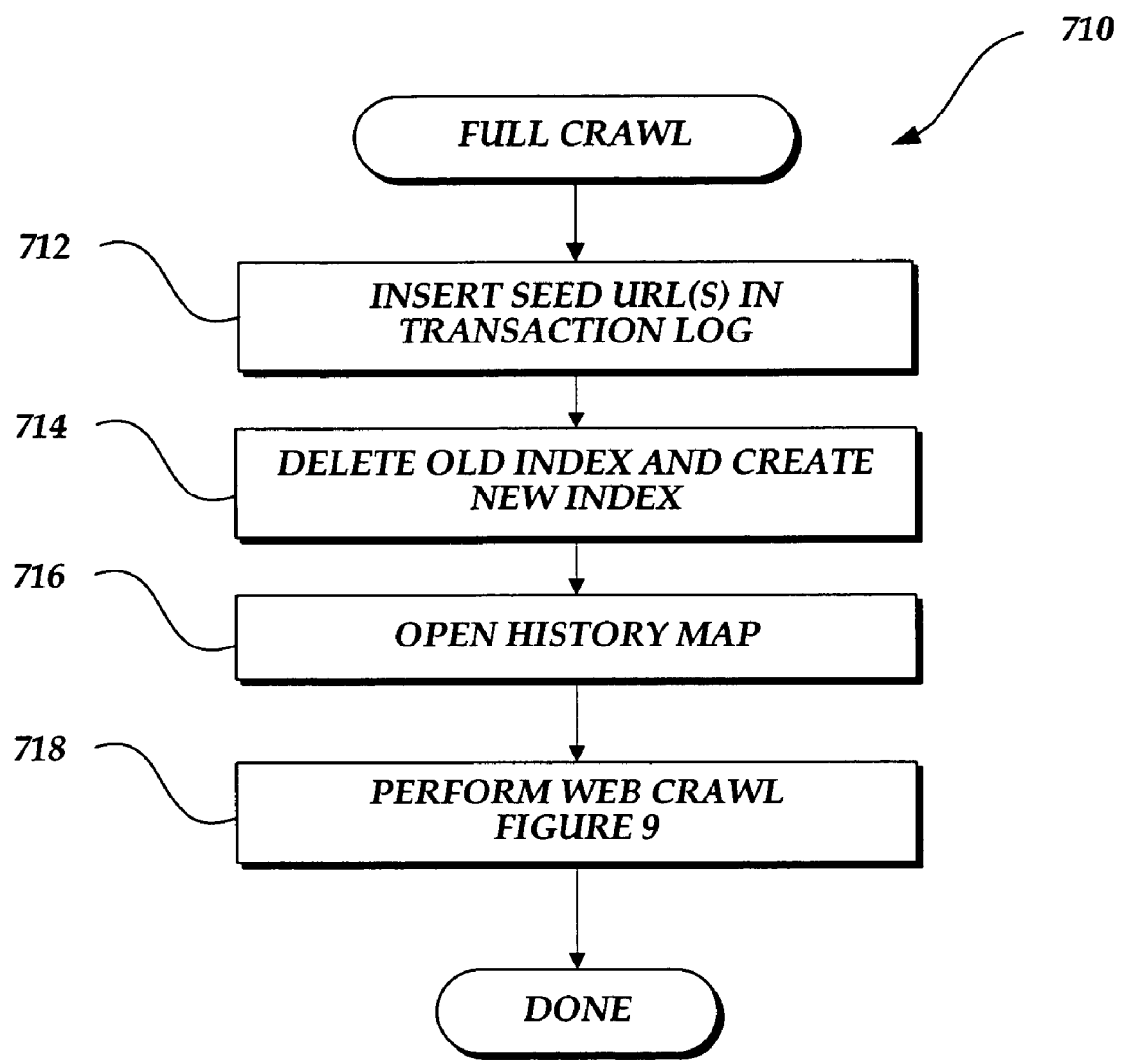
FIG. 7 is a flow diagram illustrating the process of performing a full crawl, in accordance with the invention.
Figure 8:
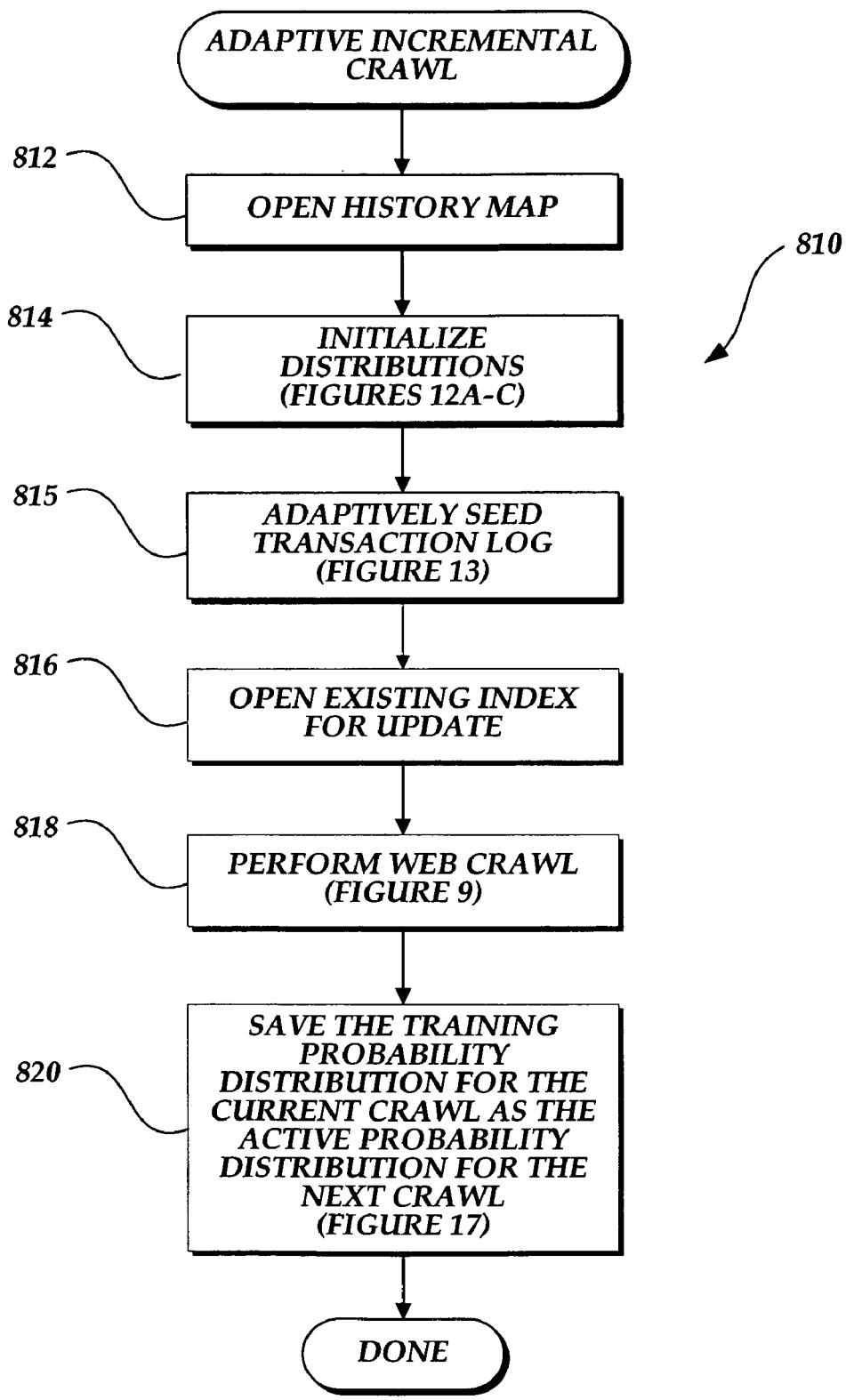
FIG. 8 is a flow diagram illustrating the process of performing an adaptive incremental crawl, in accordance with the invention.
Figure 9:
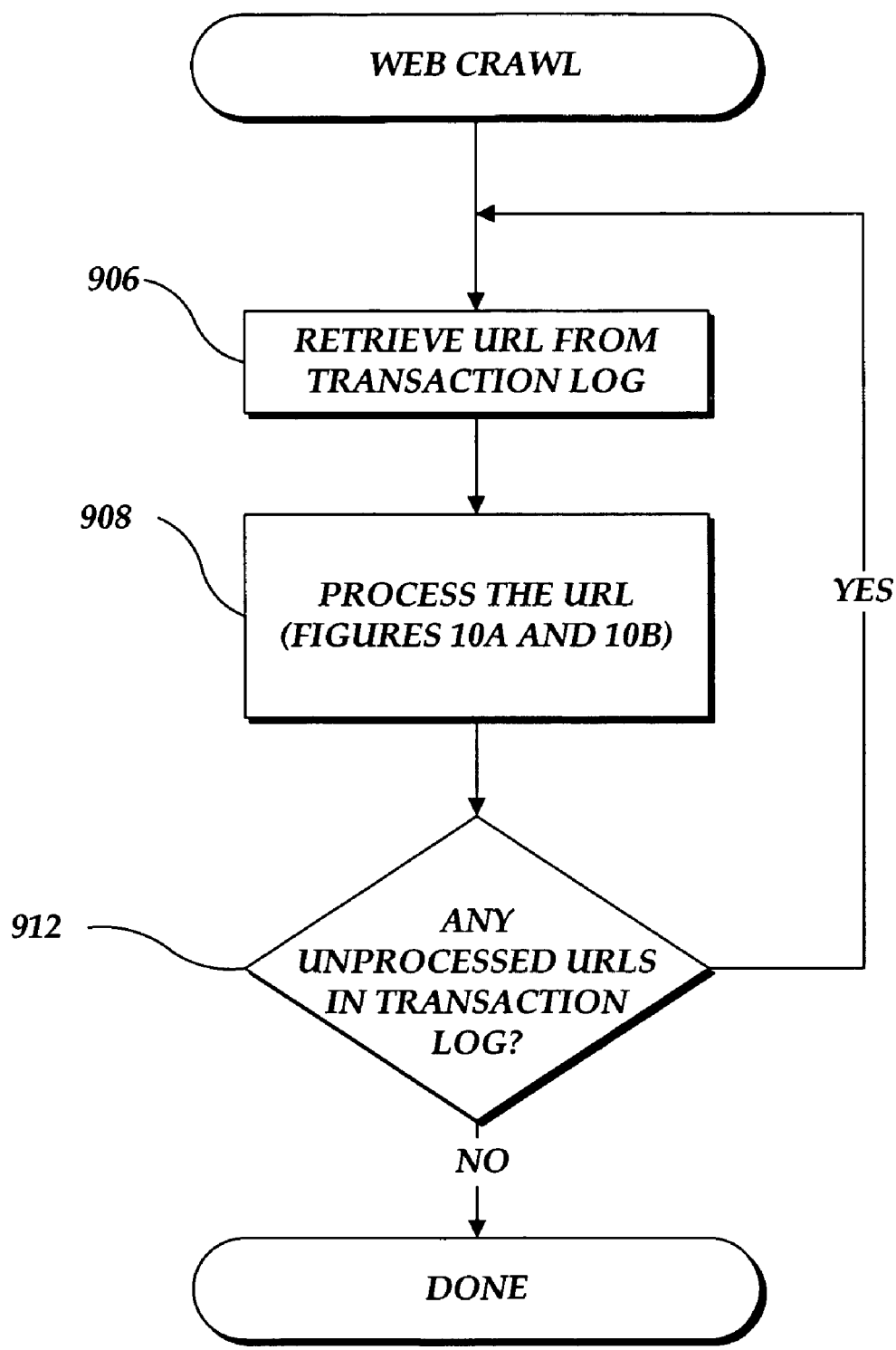
FIG. 9 is a flow diagram illustrating the process of performing a Web crawl.

The broad "types" of Web crawls performed by the present invention can be conveniently described as a "first full crawl" (FIG. 6), a "full crawl" (FIG. 7), or an "adaptive incremental crawl" (FIG. 8). A first full crawl creates and fills both an instance of the index 210 and an instance of the history map 308. A full crawl fills a new instance of the index 210 while using the existing history map 308. An adaptive incremental crawl updates the existing index 210 as it selectively revisits the URLs contained in the existing history map 308 and checks for changes to the documents at those locations. Once initialized as a first full crawl, a full crawl, or an adaptive incremental crawl, the method and system of the Web crawl described in FIGS. 7-9 is essentially the same for all types of Web crawls performed by the invention.

Figure 6:
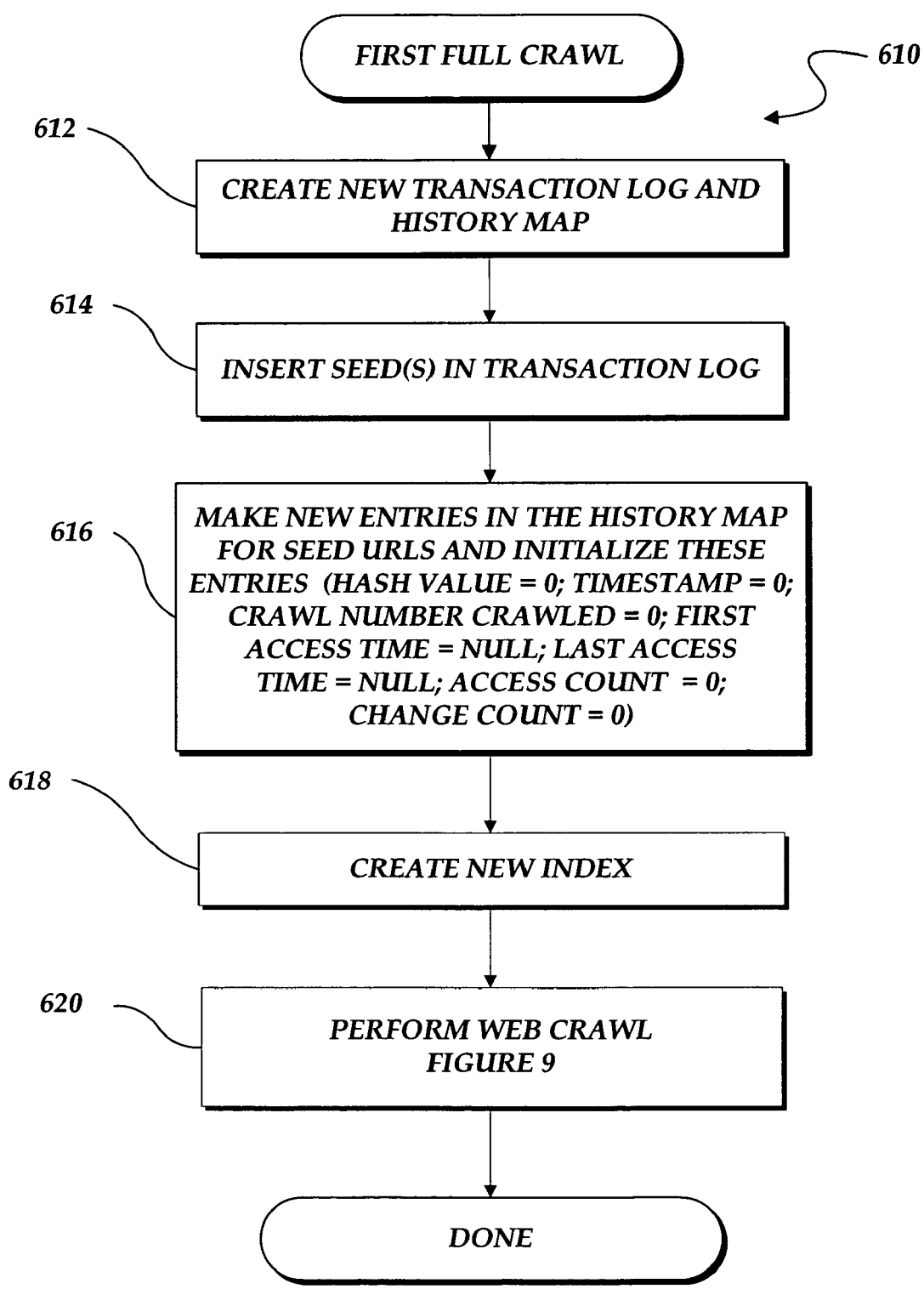
FIG. 6 is a flow diagram illustrating the process of performing a first full crawl in accordance with the invention.

FIG. 6 illustrates a process performed during a first full crawl 610. At step 612, the gatherer 304 creates a new transaction log 310 and a new history map 308, neither of which have any preexisting entries 410 or 510. The transaction log 310 is then loaded with one or more entries 510 containing "seed" URLs 512 in step 614. The inserted URLs 512 are referred to as "seeds" because they act as starting points for the Web crawl.

In step 616, corresponding entries 410 are made in the history map 308 for each of the seed entries 510 made in the transaction log 310. The history map entries 410 are initialized so that the time stamp 414, the hash value 416, the crawl number crawled 418, the crawl number modified 420, change count 426 and the access count 428 are all set equal to zero or an equivalent "empty" or "null" value. The first access time 422 and the last access time 424 are set to "null" values. At step 618, a new index 210 is created, and the Web crawl is performed at step 620. The operations performed during a Web crawl are detailed in FIG. 9 and described below. Briefly described, during a first full crawl 610, all the documents identified in the transaction log 310 are unconditionally retrieved. After the Web crawl, the process illustrated in FIG. 6 is complete.

FIG. 7 illustrates a process 710 performed during a "full crawl." The full crawl begins at step 712 by inserting one or more seed URLs 512 into entries 510 in the transaction log 310. At step 714, the full crawl deletes the old index and creates a new index 210. Unlike the first full crawl (FIG. 6), the full crawl 710 opens an existing history map 308 in step 716. The existing history map 308 is used during the processing of the entries in the transaction log 310. In step 718, the Web crawl is performed in substantially the same manner as that illustrated in FIG. 9 and discussed above. When the Web crawl is complete, the full crawl 710 is finished.

FIG. 8 illustrates a process 810 for performing an "adaptive incremental crawl" in accordance with the present invention. An adaptive incremental crawl is typically performed after either a full crawl or another adaptive incremental crawl. The purpose of an adaptive incremental crawl is to retrieve new documents or selectively retrieve documents that have been modified since the previous crawl. The adaptive incremental crawl selectively identifies documents that may be accessed based on a statistical model that uses the observed history of changes on previous accesses to the document.

At step 812, the adaptive incremental crawl begins by opening an existing history map 310. Briefly described, at step 814, base probability and rate distributions are initialized for use in the process of "seeding" the transaction log 310. The operations performed at step 814 are illustrated in detail in FIGS. 12A-C and described below.

At step 815, the transaction log 310 is adaptively seeded with URLs. The operations performed at step 815 are illustrated in detail in FIG. 13 and described below. Briefly described, the seeding process selects entries, based on a statistical analysis, from the history map 308 for inclusion in the transaction log 310. In this way, the resources of the gatherer 304 may be focused on URLs corresponding to documents that are mostly likely to have changed since they were last accessed.

After the transaction log is seeded, the index 210 is opened for update at step 816, and the Web crawl is performed at step 818. Again, the Web crawl is illustrated in FIG. 9 and described below. The process then continues to step 820.

At step 820, a training probability distribution computed during the Web crawl at step 818 is saved to be used as an active probability distribution for the next crawl. Training the training probability distribution is illustrated graphically in FIG. 17 and described below.

FIG. 9 illustrates in detail a process performed during a Web crawl. The process begins at step 906, where the Web crawler 206 begins retrieving and processing URLs from the transaction log 310. Specifically, at step 906, a worker thread 312 retrieves a URL 512 from an unprocessed entry 510 in the transaction log 310. The URL is passed to the processing illustrated in FIGS. 10A and 10B at step 908. Briefly described, at step 908, a determination is made whether to retrieve the document identified by the URL, and if so, the document is retrieved. Each entry 510 in the transaction log 310 is processed in this manner until it is detected in a decision step 912 that all the entries 510 in the transaction log 310 have been processed.

Although the process 620 is discussed herein with reference to a single worker thread 312, preferably the mechanism of the invention may include multiple worker threads 312, each worker thread, in conjunction with other components, being capable of performing a Web crawl.

Figure 10A:
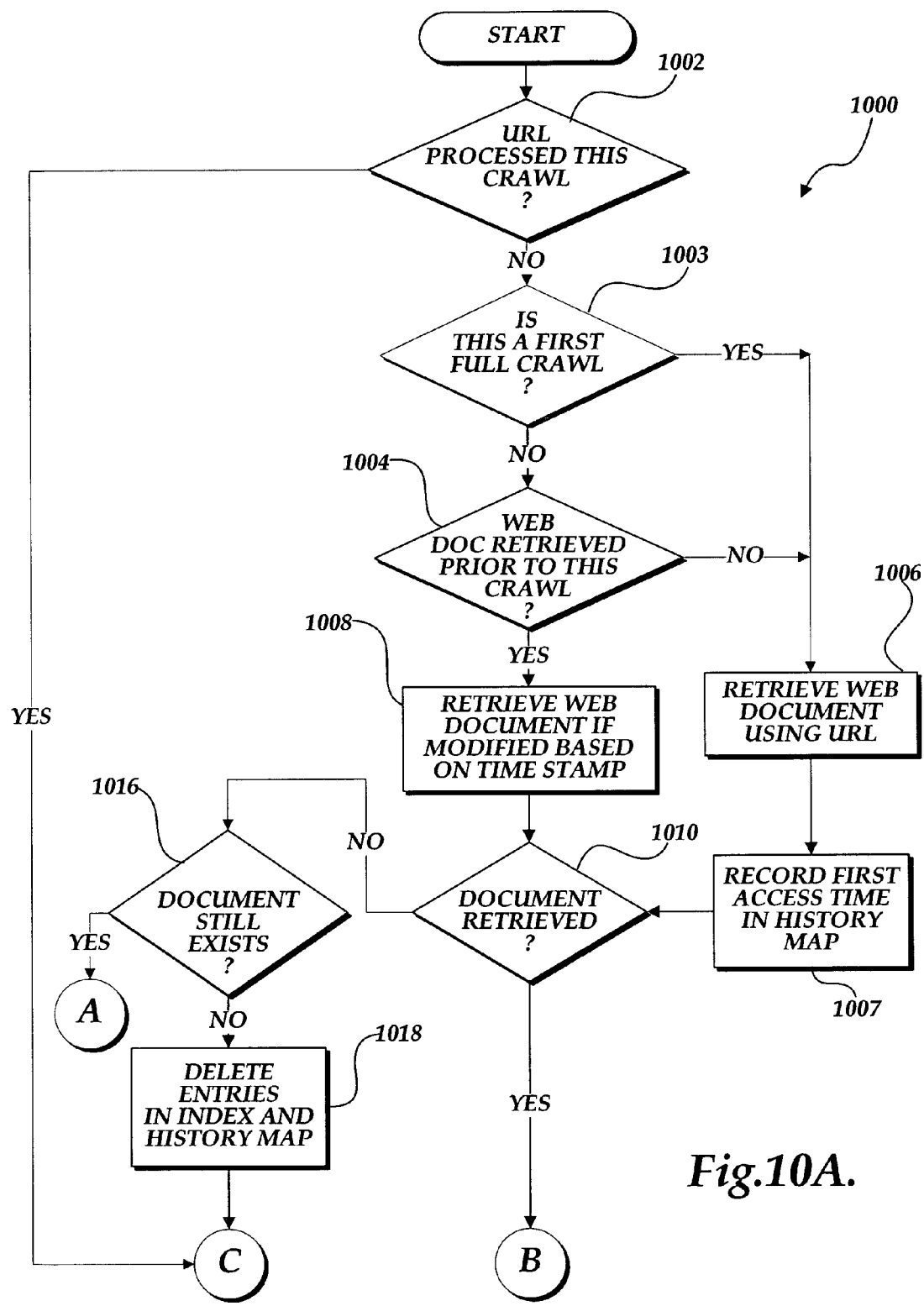
FIGS. 10A and 10B are flow diagrams illustrating the processing of URLs during a Web crawl, in accordance with the invention.
Figure 10B:
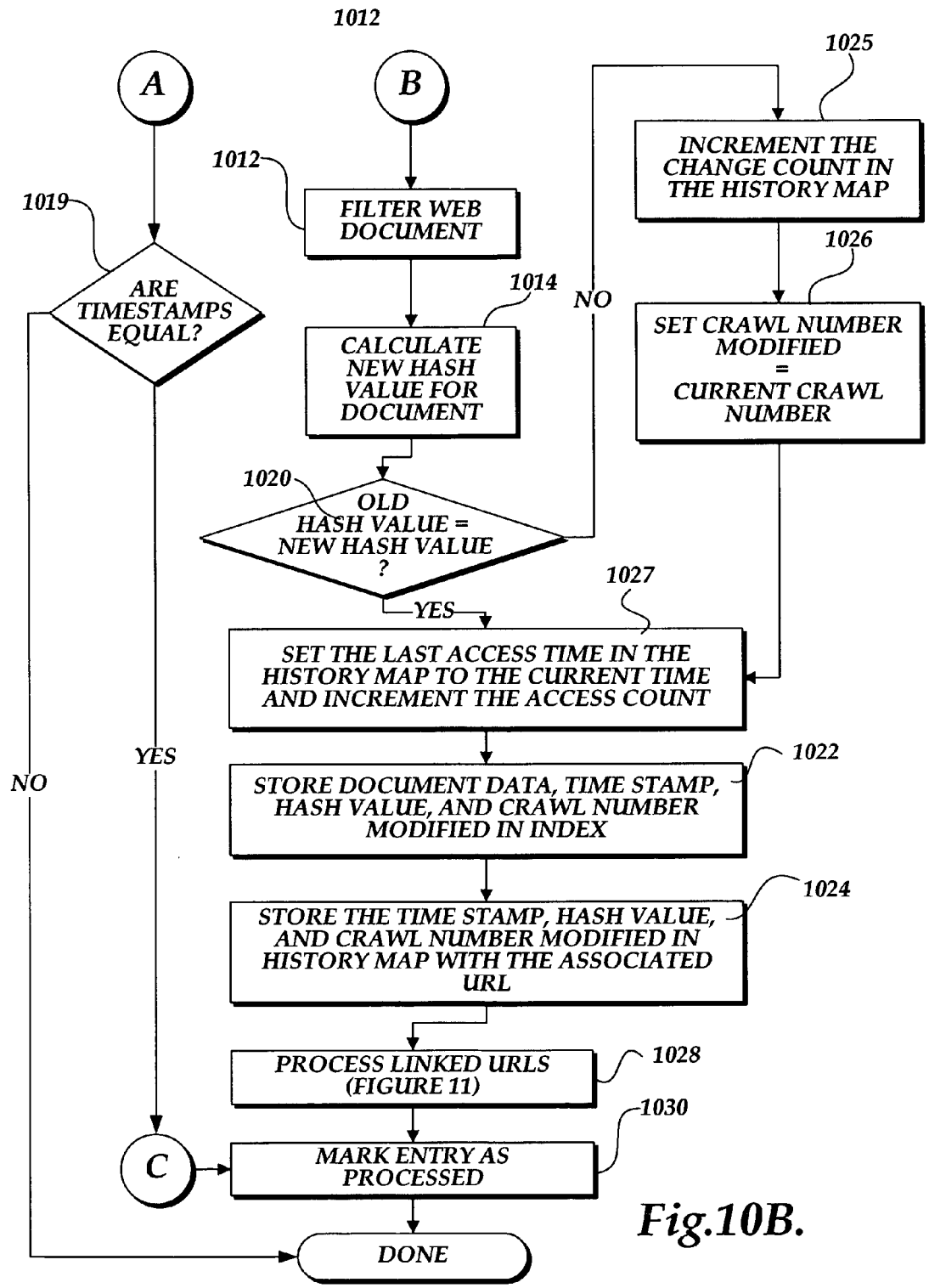

FIGS. 10A and 10B illustrate in detail the processing of a URL retrieved from the transaction log 310. To begin, at step 1002, a determination is made whether the URL 512 for the current entry in the transaction log 310 has been processed during the current crawl. That determination is made by accessing the history map 308 to retrieve the crawl number crawled 418 associated with an entry 410 having the same URL 412 as the current entry 510 in the transaction log 310. If the crawl number crawled 418 for that entry matches the current crawl number, the URL has been processed during the current crawl, and the process 708 is complete for the URL. However, if the crawl number crawled 418 does not match the current crawl number, or if the history map 308 does not contain an entry for the URL, the URL has not been processed during the current crawl, and processing proceeds to decision step 1003.

If the current crawl is a first full crawl, the decision step 1003 passes control to step 1006, where the document associated with the URL is unconditionally retrieved and the first access time 422 is set equal to the current time in step 1007. In other words, documents identified in the transaction log 310 are unconditionally retrieved during the first full crawl. If the current crawl is not a first full crawl, processing proceeds to decision step 1004.

At decision step 1004, a determination is made whether the document has been retrieved prior to the current crawl (e.g., if there is an entry 410 for the URL in the history map 308 or the entry in the history map 308 has a zero value in the crawl number crawled 418). If not, the document is unconditionally retrieved from the URL at step 1006, and the first access time 422 for the document is set in the history map 308 to the current time at step 1007. If, at decision step 1004, the document has been previously retrieved, processing proceeds to step 1008.

At step 1008, a worker thread passes the URL 512 and time stamp 414 for the current entry in the transaction log 310 to the filter daemon 314, which conditionally retrieves the document corresponding to the URL 512. In particular, the retrieval of the document is conditioned upon an indication that the document has been modified, based upon a saved time stamp 414 of the document. If the time stamp currently associated with the document at the Web server is later than the time stamp 414 stored in the history map 308, the document is retrieved.

In one actual embodiment of the invention, at step 1008, when the document is retrieved using the HTTP protocol, an HTTP "Get If-Modified-Since" command is sent from the Web crawler 206 to the Web server addressed by the URL. This command includes a specification of a time stamp. The Web server receiving this command compares the received time stamp with the time stamp of the corresponding document on the Web server. The Web server transmits the corresponding document to the Web crawler 206 only if the time stamp currently associated with the document on the Web server is later than the received time stamp (i.e., the document has been modified).

Similarly, if the FILE protocol is used to retrieve a document, file system attributes are used to determine whether the document has a file date more recent than the time stamp stored in the history map. A similar determination is made when other protocols are used to retrieve a document.

At step 1010, a determination is made whether the document was retrieved at step 1008. Some Web servers do not support the HTTP "Get If-Modified-Since" command, and always transfer a document in response to this command. Therefore, receiving a new document at step 1008 and determining that a new document is retrieved at step 1010 does not guarantee that the retrieved document has a more recent time stamp. However, processing continues to step 1012 (FIG. 10B) under the assumption that the newly retrieved document has a more recent time stamp.

If the document was not retrieved, at step 1016 a determination is made whether the document still exists. If the document no longer exists, at step 1018, entries pertaining to the document are deleted from the index 210 and the history map 308. The entry 510 is then marked as processed at step 1030. An error code 516 may also be inserted into the error code field 516.

If, at decision step 1016, the document still exists but has not been retrieved, the process continues to decision step 1019 that determines if the time stamps are equal (unchanged) and if so, the entry 510 is marked as complete in step 1030. If a determination cannot be made at step 1019, the process 708 is complete for the URL and the entry 510 is not marked as complete. This may occur, for example, if communication with a server cannot be established. Because the entry 510 for this URL is not marked as complete, the worker thread may attempt to retrieve the URL again later. The number of retrieval attempts for any given URL can be limited to a predetermined number. After this predetermined number is reached, the entry 510 is marked as complete and error code is inserted in the error code field 516.

At step 1012 (FIG. 10B), the filter daemon 314 filters the new document data. The worker thread 312 then calculates a hash value from the filtered data received from the filter daemon 314 at step 1014. As discussed above, the worker thread preferably uses a secure hash function, such as MD5, to calculate the hash value.

At step 1020, the hash value 416 of the previously retrieved corresponding document 410 is retrieved from the history map 308 and is compared with the new hash value calculated at step 1014. Equal hash values indicate that the filtered data corresponding to the newly retrieved document is the same as the filtered data corresponding to the previously retrieved version of the document. During a first full crawl, the hash value stored in the history map 308 is zero, so the hash values are not equal. If the hash values are equal, the process continues to step 1027. If, at step 1020, the hash values are not equal (indicating that the document has changed), the process continues to step 1025.

At step 1025, the change count 426 is incremented. Then, at step 1026, the crawl number modified 420 in the history map 308 is set to be the current crawl number. This change made to the change count 426 and the crawl number modified 420 indicates that the document was found to have changed in a substantive way. And, at step 1027, the last access time 424 is set to the current time, the access count 428 is incremented, and the process then continues to step 1022.

At step 1022, the document information is stored in the index 210. The information stored may include the document data, the time stamp 414 associated with the document, the document hash value 416, and the crawl number modified 420. If the document was unchanged, as indicated by the hash values being equal, the previous value of the crawl number modified 420 (stored in the history map 308) is added to the index, along with the filtered data, hash value, and document time stamp. The document may therefore have a time stamp that is more recent than its crawl number modified, for example, if the time stamp has changed but the filtered data is unchanged.

At step 1024, the entry 410 in the history map 308 associated with the URL 412 is updated with the new hash value 416, the document time stamp 414, and the crawl number modified 420 that was set at step 1026. While not required, data from the document may be stored along with the newly computed hash value and document time stamp even if the hash values are equal.

Figure 11:
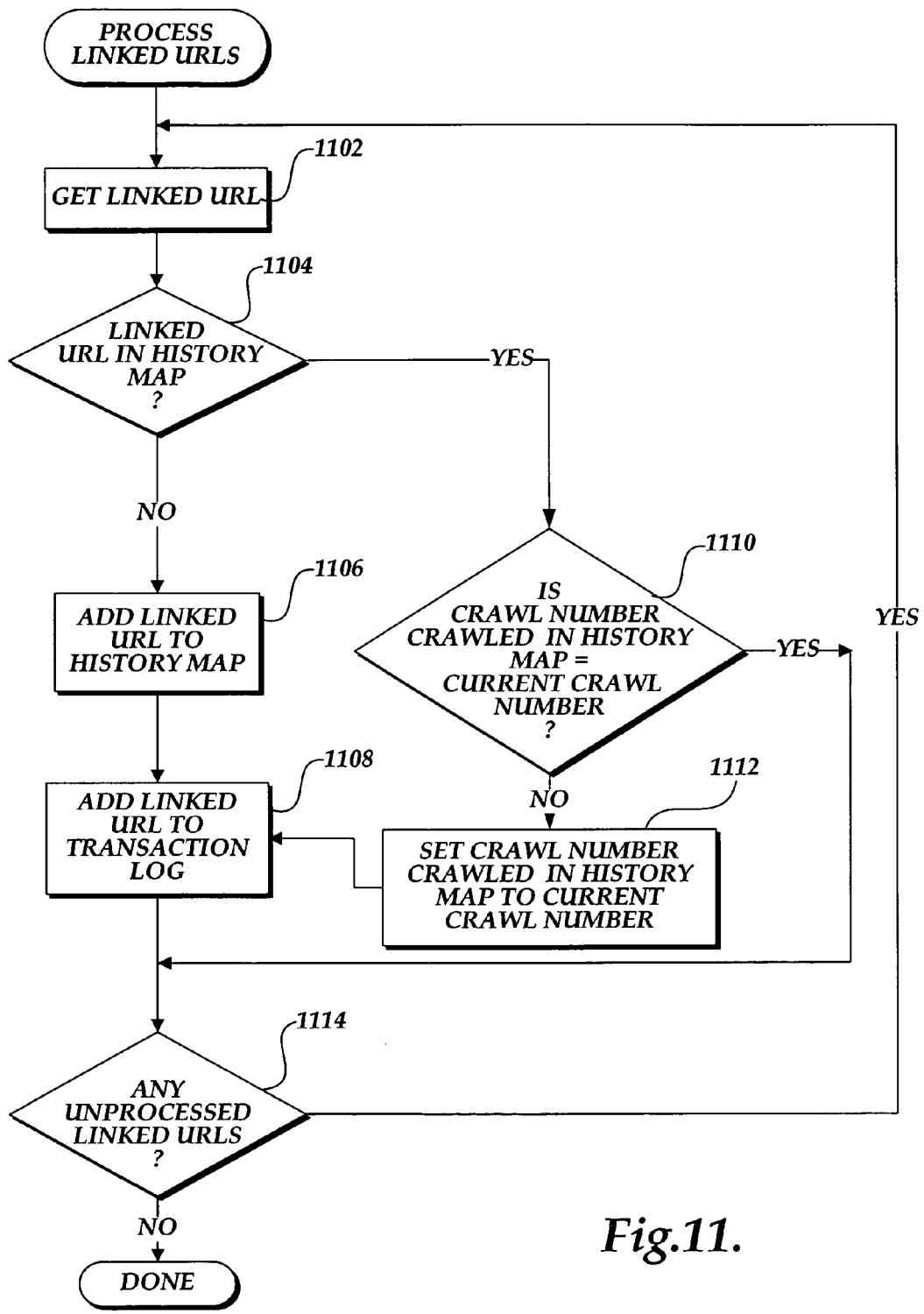
FIG. 11 is a flow diagram illustrating the processing linked URLs during a Web crawl.

At step 1028, the URLs that are included as hyperlinks in the newly retrieved document are processed. The processing of the linked URLs at the step 1028 is illustrated in FIG. 11 and discussed below. At step 1030, the status 514 for the entry 510 being processed is marked as processed. Besides being used in step 912 to determine if all the entries 510 have been processed, marking the entries 510 as they are completed assists in a recovery from a system failure by allowing the crawler to continue the crawl from where it left off. After step 1030, the processing of the URL is finished.

FIG. 11 illustrates the processing of the linked URLs contained within a document. At step 1102, a linked URL is retrieved from the filtered data passed from the filter daemon 314. At step 1104, a determination is made whether the history map 308 contains the linked URL. If the history map does not contain the linked URL, at step 1106, the linked URL is added to the history map 308 and the entry 410 is initialized as discussed above. The linked URL is also added to the transaction log 310 at step 1108, and processing continues to decision step 1114.

If, at step 1104, it is determined that the history map 308 contains the linked URL, processing continues to step 1110, where a determination is made whether the crawl number crawled in the history map 308 associated with that URL is set to the current crawl number. A negative determination indicates that the linked URL has not yet been processed during the current crawl and the crawl number crawled is set to the current crawl number in step 1112, and the URL is added to the transaction log 310 in step 1108. If the crawl number crawled 318 is equal to the current crawl number, the URL has already been added to the transaction log 310, the step 1108 is skipped, and the processing proceeds to step 1114.

At decision step 1114, a determination is made whether there are any additional linked URLs in the filtered data. If any additional linked URLs exist, processing returns to step 1102, to process the next linked URL. If, at step 1114, there are no more linked URLs to process, the processing of the linked URLs is complete.

Figure 12A:
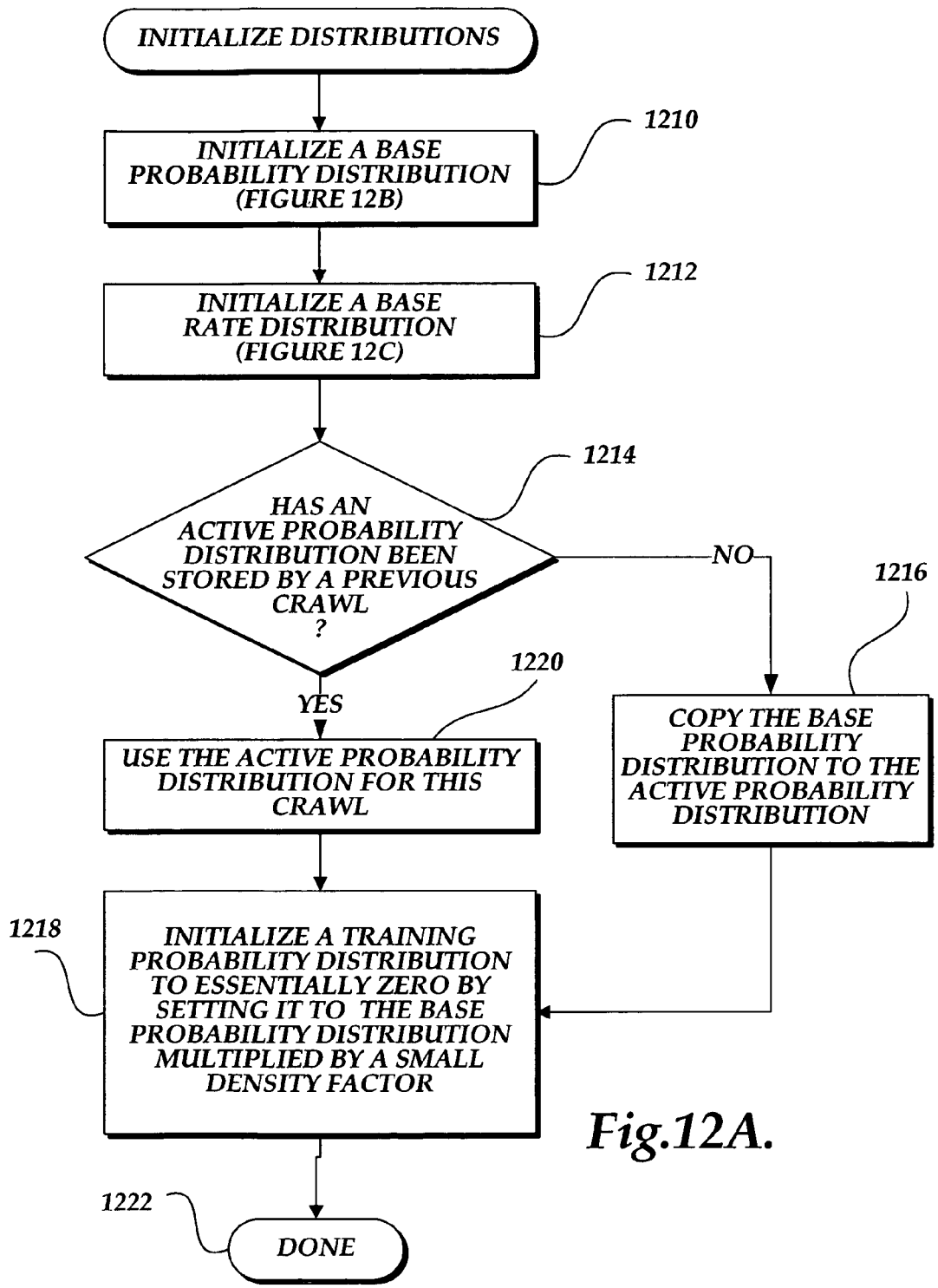

FIGS. 12A-C illustrate a process performed during an adaptive incremental crawl for initializing base probability and rate distributions. Those statistical distributions may be used as a starting point by the statistical model to determine if a document should be accessed. A probability distribution (base, document, training, or active) estimates a continuous probability function that a document has changed at a given change rate. Because of the constraints of current computer processing capabilities, the statistical model estimates the continuous probability function by tracking a plurality of probabilities at sample rates. The greater the "resolution", or number of probabilities at sample rates tracked, the better the estimate of the actual function. In an actual embodiment of the invention, the resolution is twenty sample points, or probabilities. This resolution is believed to provide a reasonable balance between accuracy and speed of computation. Of course, as the speed of computers increases, the resolution may be advantageously increased.

Turning to FIG. 12A, at step 1210, a base probability distribution is initialized so that each probability in the distribution contains an estimated initial probability that one document will change with a certain change rate. These estimated initial probabilities need not be very accurate initially, since the method described below will improve the accuracy through training. However, more accurate initial probabilities may be preferable.

A method of an actual embodiment of the invention for estimating a set of starting values for the base probability distribution is illustrated in FIG. 12B. It has been estimated that approximately 30% of the documents on the Web will change at varying rates over many Web crawls, while the remaining approximately 70% of the documents will remain relatively static during that interval. Since the probability distribution will contain a set of probabilities P1 to Pn that sum to 1 (or in percentages: 100%) regardless of the resolution, 30% of the 100% is distributed evenly over P1 to P(n−1) such that P(n)=0.3/(n−1). The remaining 70% of the 100% of probabilities is assigned to the last probability (Pn=0.7) in the distribution.

Expressed in this way, the base probability distribution, and all probability distributions that descend from it, represent the probability that the document will change at a given rate, over a plurality of sample rates. It will be apparent to one skilled in the art that there are many ways to estimate and express initial base probability distributions while remaining within the spirit and scope of the present invention. For instance, the initial probability rates may be set to anything from normalized random numbers to actual probability rates determined experimentally over time.

Returning to FIG. 12A, a base rate distribution is provided for the statistical computations regarding the document. The base rate distribution reflects the selection of the sample points at which the continuous probability function will be estimated. At step 1212, the base rate distribution is initialized. One computation for initializing the base rate distribution is illustrated in FIG. 12C. In the base rate distribution, a plurality of change rates are chosen and expressed in an actual embodiment of the invention as number of changes per second. Each change rate has a corresponding probability in the base probability distribution (i.e., the base distributions have the same resolution). In an actual embodiment of the invention, the first rate R1 to rate R(N−1) are chosen at evenly spaced change rates between a Low change rate and a High change rate using the formula:

Formula 1:
$$Rn = \frac{1}{3600 * \left[ High + (n-1) * \left( \frac{Low - High}{N-2} \right) \right]}$$

Where High is the highest expected change rate, Low is the lowest expected change rate, and N is the number of samples, or resolution. The final change rate (RN) in the change rate distribution is assigned a change rate that is low enough that the document is essentially considered static. Although one actual method for selecting sample rates has been described here, those skilled in the art will appreciate that any number of ways are available for selecting a sample rate and each may be employed by the mechanism of the invention without deviating from the spirit or scope of the invention.

Returning to FIG. 12A, at decision step 1214, a determination is made whether an active probability distribution was stored during a previous crawl. Each crawl begins with an active probability distribution from which a training probability distribution and each document probability distribution is based. The training probability distribution becomes the active probability distribution for the next crawl and so on in recursive succession. Thus, decision step 1214 determines if an active probability distribution was stored during a previous crawl, and if so, the process continues to step 1220, where the stored active probability distribution is retrieved for use as the active distribution for the current crawl. From step 1220, the process continues to step 1218.

If, at decision step 1214, a determination is made that an active probability distribution was not stored during a previous crawl (e.g., the previous crawl was a first full crawl), the process continues to step 1216. At step 1216, the base probability distribution is copied to an active probability distribution for the current crawl, and the process continues to step 1218.

At step 1218, the base probability distribution is copied to a training probability distribution for the current crawl and set to essentially zero by multiplying each probability in the base probability distribution by a very small diversity constant. Once the starting point for each of the distributions is initialized, the process of FIG. 12A is complete and terminates at ending step 1222.

Figure 13:
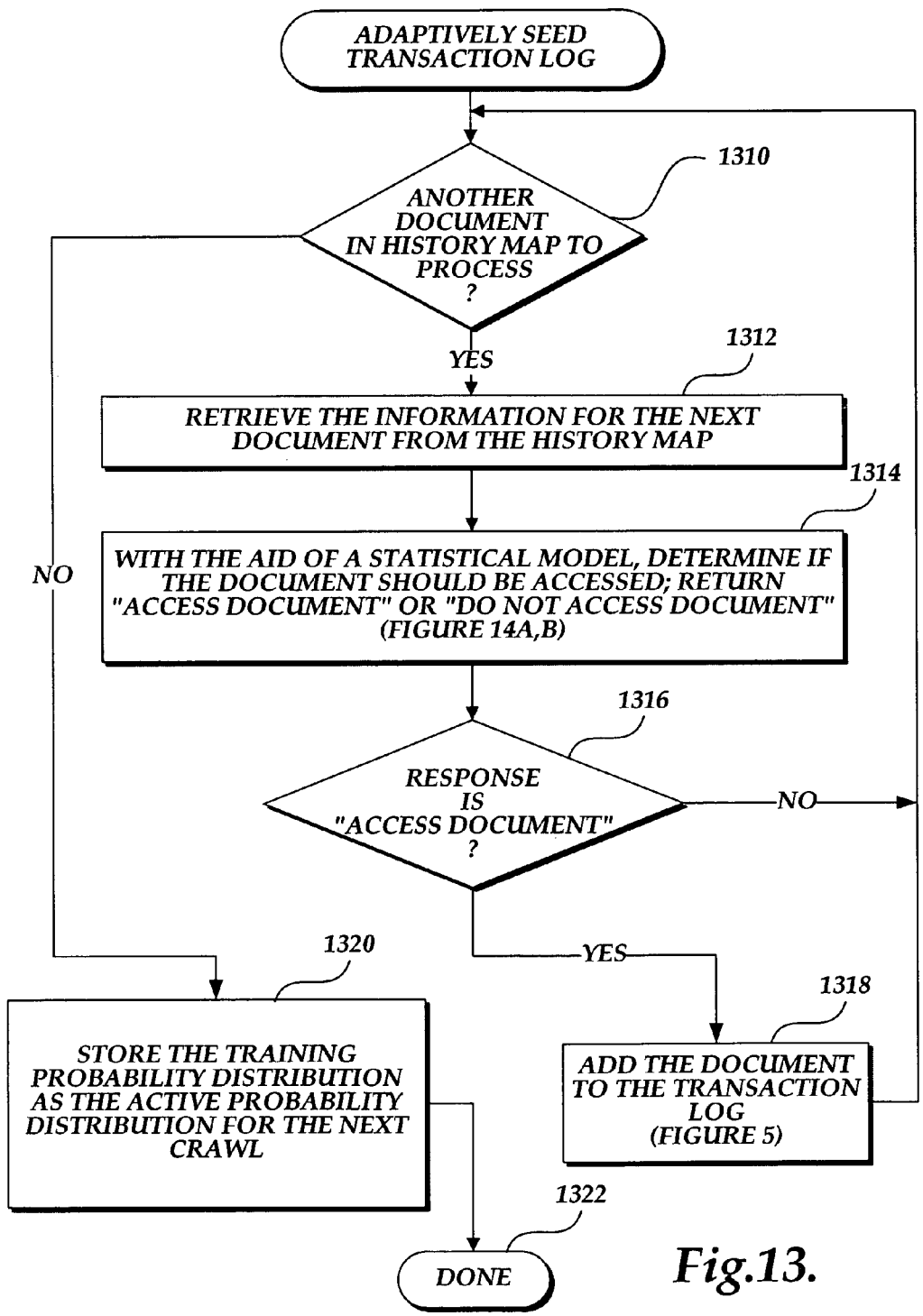
FIG. 13 is a functional flow diagram of the process of the present invention for adaptively seeding a transaction log.

FIG. 13 illustrates the steps performed during an adaptive incremental crawl to seed entries 510 in the transaction log 310 with entries 410 from the history map 308. At decision step 1310, a determination is made whether there remain documents in the history map 308 to be processed. While there remain documents to process, the decision step 1310 passes control to step 1312.

Figure 14A:
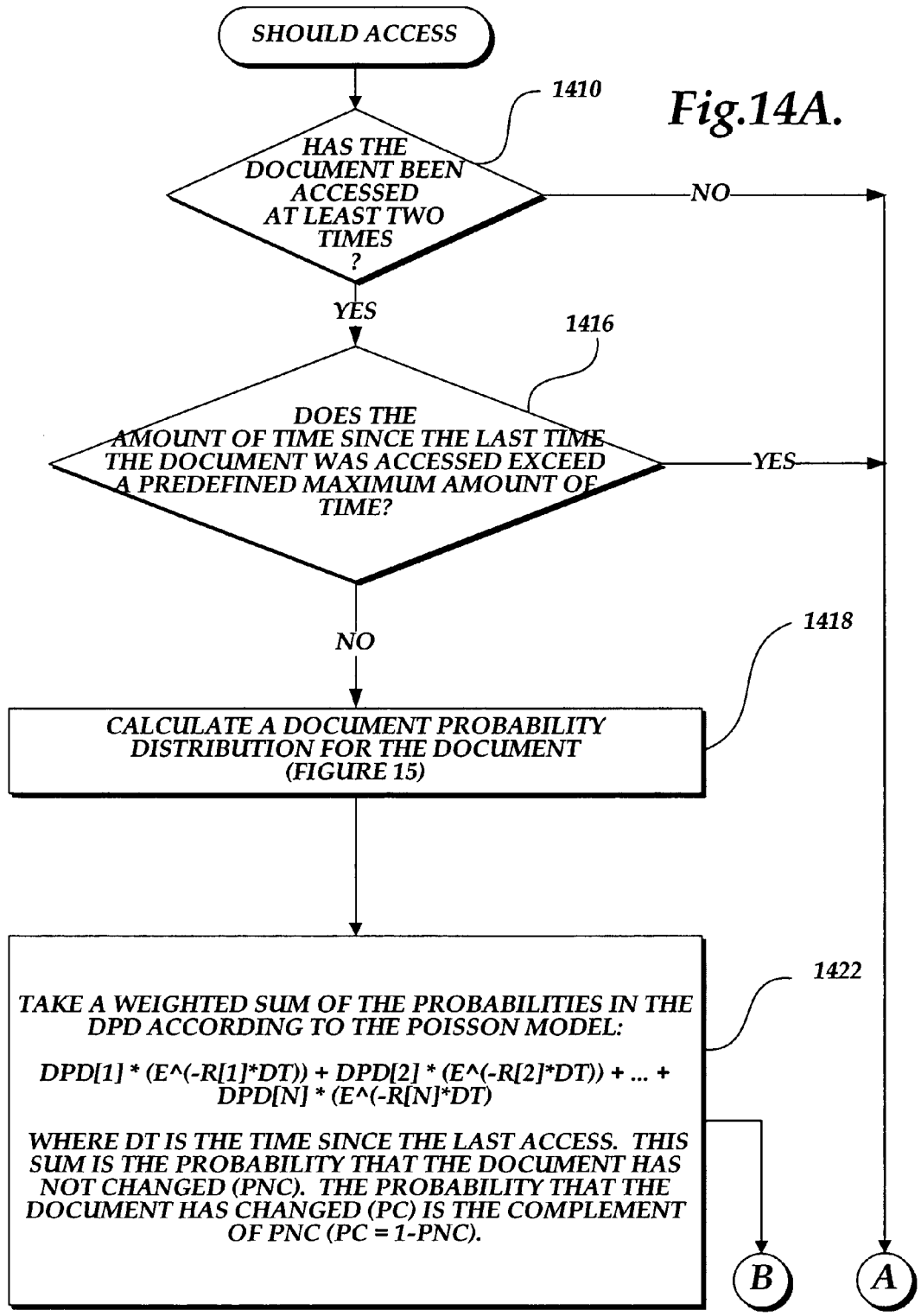
FIGS. 14A-B are a functional flow diagram illustrating a process of the present invention for determining if a document should be retrieved during a current crawl.
Figure 14B:
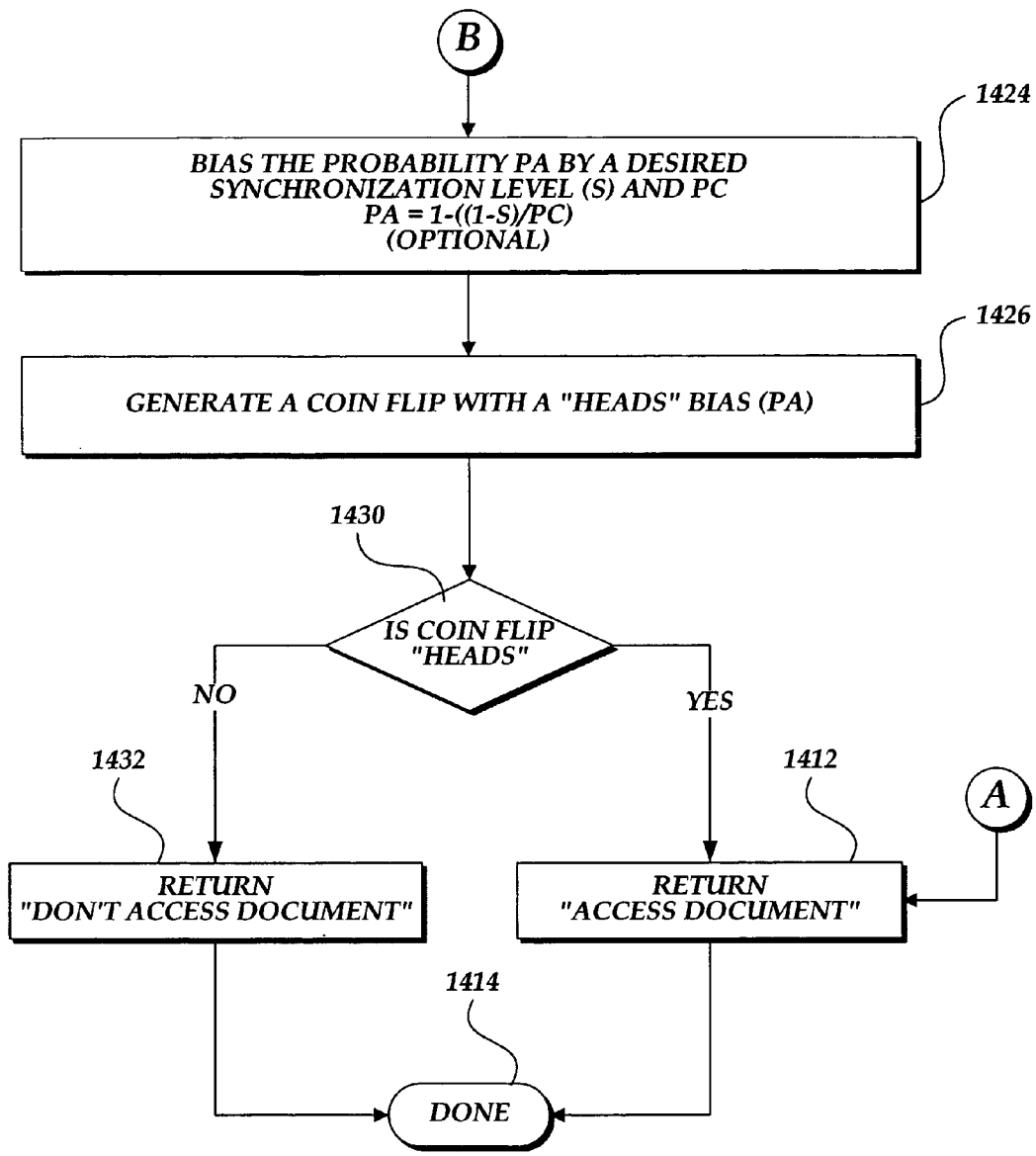

At step 1312, the next entry 410 is retrieved from the history map 308, and the process continues to step 1314. At step 1314, the historical information contained in the retrieved entry 410 is analyzed with the aid of a statistical model to determine if the document should be accessed. The analysis performed at step 1314 is illustrated in FIGS. 14A and 14B and described below. This analysis returns a response such as either "access document" or "do not access document." After receiving the response, the process continues at decision step 1316.

At decision step 1316, if the response from the analysis at step 1314 is to "access document," the process continues to step 1318, where the document URL 412 is added to the transaction log 310. The process then returns to decision step 1310, where the process repeats. If the response from the analysis 1314 is "don't access document," the process returns to decision step 1310 without adding the document URL 412 to the transaction log 310.

When every document in the history map 308 has been processed, decision step 1310 passes the process to step 1320, where the training probability distribution is stored as the active probability distribution for the next crawl.

FIGS. 14A and 14B illustrate a process for determining whether the document should be accessed based on a statistical model. In this embodiment, at least two accesses of the document are completed before a document probability distribution is trained for experience with the document. If the document has not been accessed at least two times, decision step 1410 passes the process to step 1412, where an "access document" response is returned. If the document has been accessed at least two times, the process continues from decision step 1410 to decision step 1416.

At decision step 1416, a determination is made whether a predefined maximum amount of time has expired since the last time the document was accessed. In other words, the present invention optionally provides a mechanism to ensure that a document is retrieved after a certain amount of time regardless of whether the document may have changed. If the time has expired, the process continues to step 1412 where an "access document" response is returned. If not, the process continues to step 1418.

Figure 15:
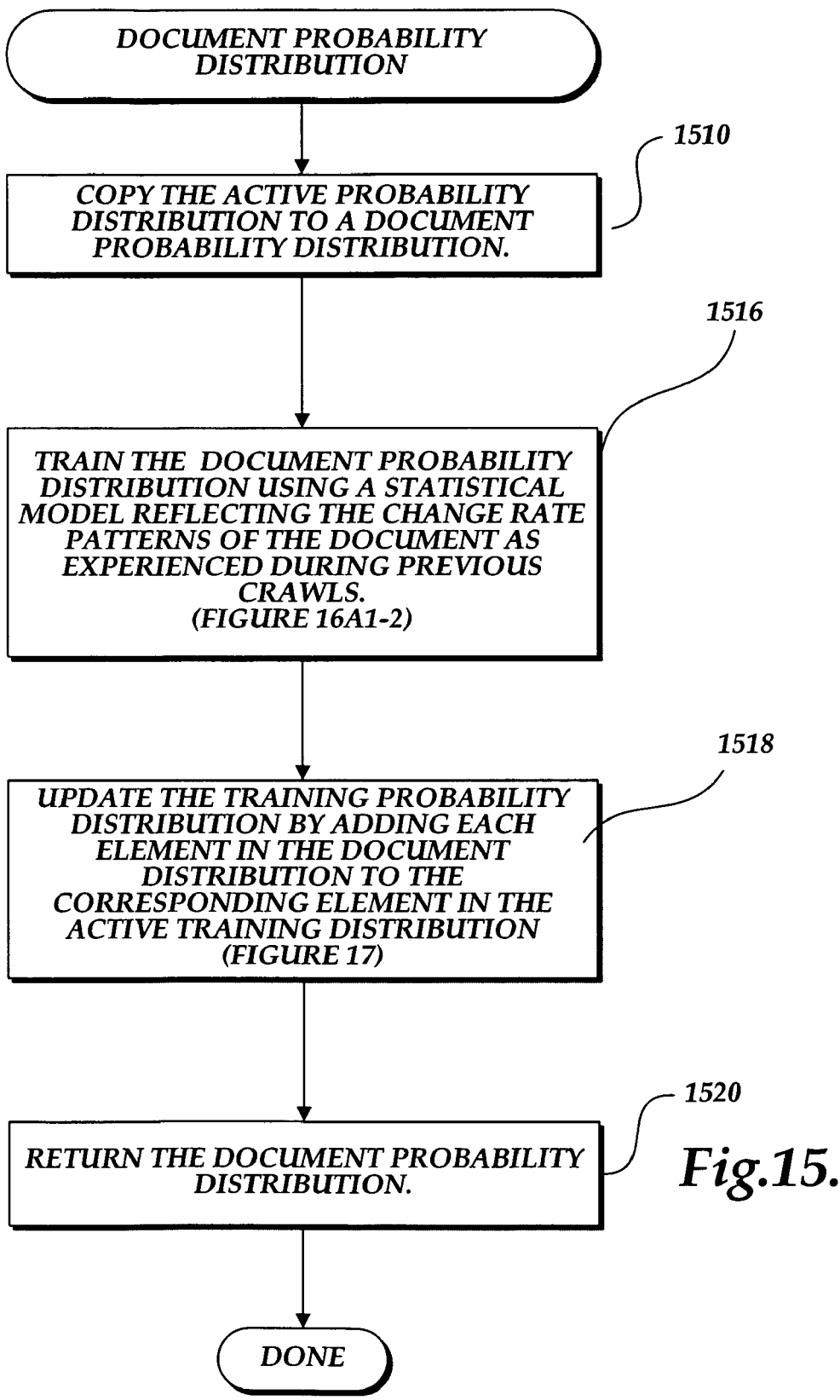
FIG. 15 illustrates the process of creating and training a document probability distribution, in accordance with the present invention.

At step 1418, a document probability distribution is calculated for the document being processed. The calculation of the document probability distribution is illustrated in FIG. 15 and described below. Briefly described, the document probability distribution includes a number of probabilities indicative that a document has changed at a given change rate. After the document probability distribution for the document is calculated, the process continues to step 1422.

At step 1422, a weighted sum of the probabilities in the document probability distribution is taken according to the Poisson model, with DT equal to the time since the last access of the document (i.e., $DPD[1]*(E^{\wedge}(-R[1]*DT))+ DPD[2]*(E^{\wedge}(-R[2]*DT))+\ldots +DPD[n]*(E^{\wedge}(-R[n]*DT))$. The weighted sum thus computed is the probability that the document has not changed (PNC). The probability that the document has changed (PC) is the complement of PNC (PC=1−PNC).

At step 1424, a probability that the document will be accessed (PA) may be optionally computed and biased by both a specified synchronization level (S) and the probability that the document has changed (PC). In other words, this embodiment of the invention optionally allows the ultimate decision whether to retrieve a document to be biased by a synchronization level, specified by a system administrator. By adjusting the synchronization level for different crawls, a system administrator may bias the likelihood of retrieving documents in accordance with the administrator's tolerance for having unsynchronized documents. Thus, using the formula PA=1−((1−S)/PC), where S is the desired synchronization level and PC is the probability that the document has changed as calculated in step 1422, a probability (PA) that the document should be accessed is calculated.

At step 1426, a coin flip is generated with a "heads" bias equal to the probability of access (PA) computed in step 1424. A decision is made to either "access" or "not access" the document based on the result of this coin flip. The coin flip is provided because it may be desirable to add a random component to the retrieval of documents in order to strike a balance between the conservation of resources and ensuring document synchronization. The bias PA calculated at step 1424 is applied to the coin flip to influence the outcome in favor of the likelihood that the document has changed, modified by the desired synchronization level. The outcome of the coin flip is passed to decision step 1430.

At decision step 1430 if the outcome of the coin flip is "heads", the instruction to "access document" is returned at step 1412. Otherwise, the instruction "don't access document" is returned at step 1432. Following steps 1412 or 1432, the process of FIGS. 14A and 14B is done.

FIG. 15 illustrates a process performed to calculate a document probability distribution. The process begins at step 1510 by making a copy of the active probability distribution as a new instance of a document probability distribution. At step 1516, the document probability distribution is trained using a statistical model that reflects the change rate patterns of the document as experienced during previous Web crawls. The training of the document probability distribution is illustrated in detail in FIGS. 16A1-2 and described below. Briefly described, the document probability distribution is trained for "change," "no change," and "no change chunk" event intervals using a discrete random-variable distribution. Once the document probability distribution has been trained, the process continues to step 1518, where the document probability distribution is added to the training probability distribution as illustrated in more detail in FIG. 17. The document probability distribution is returned to step 1418 of FIG. 14A in step 1520, and the process illustrated in FIG. 15 is finished.

Figures 1, 16A:
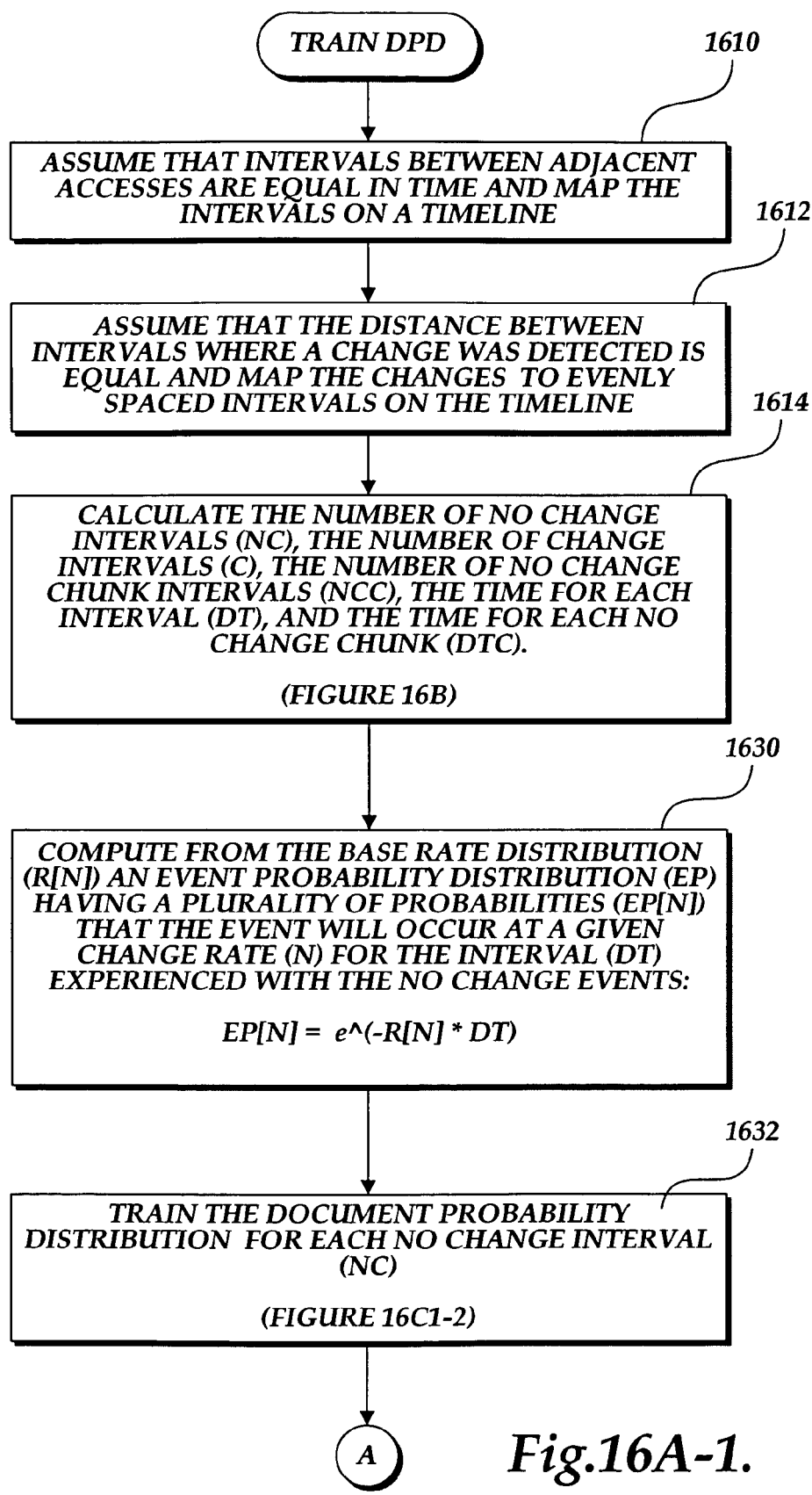
Figures 2, 16A:
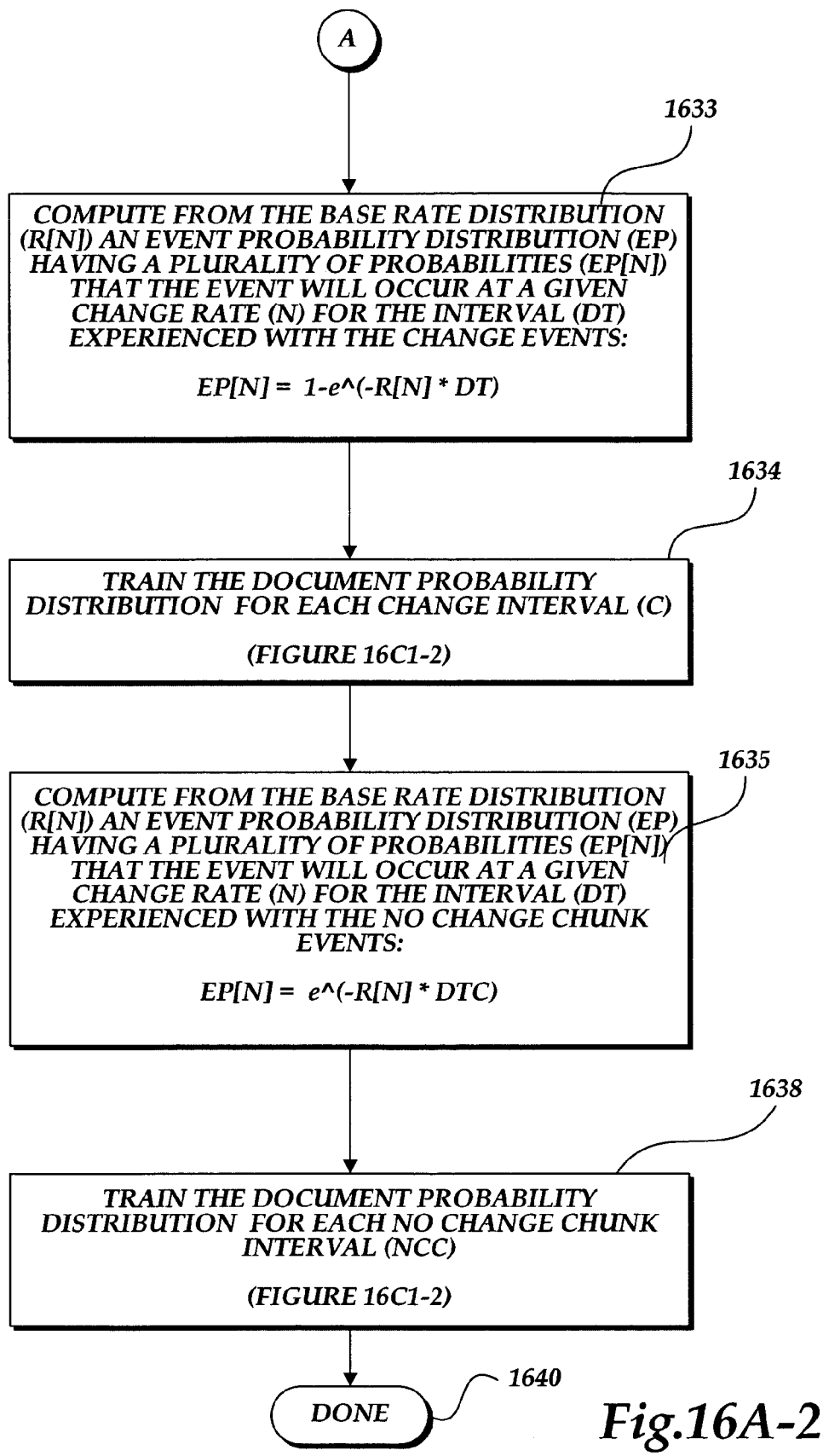
Figure 16B:
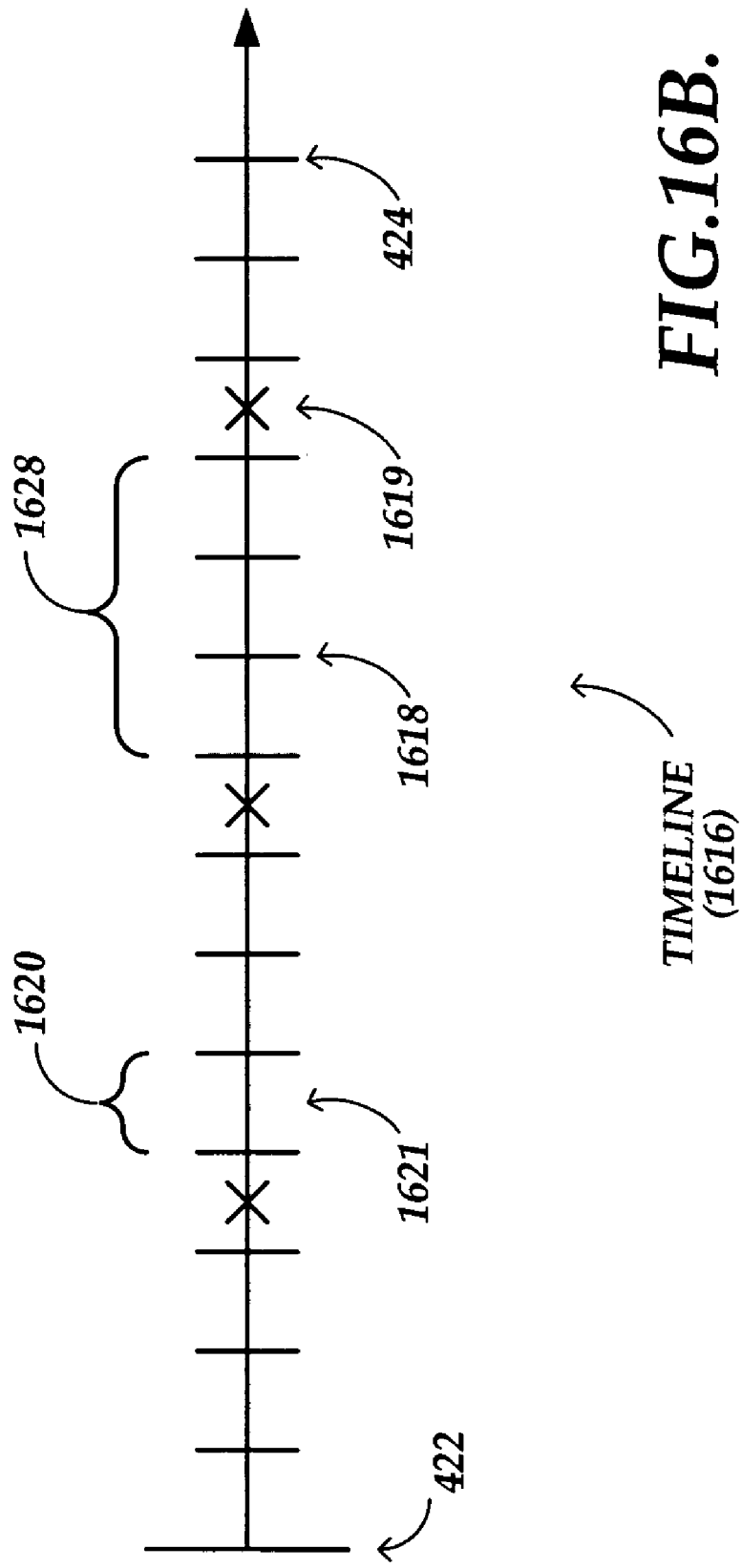
FIG. 16B is a pictorial illustration of a timeline used for mapping events used in the training of the document probability distribution, in accordance with an actual embodiment of the present invention.

FIGS. 16A1-2 illustrate a process for training the document probability distribution. At step 1610, the accesses 428 to a document are mapped to a timeline. One example of such a timeline is illustrated in FIG. 16B and described below. Briefly described, the history map 308 contains the first access time 422, the last access time 424, the change count 426, and the access count 428 for each document identified in the history map 308. The timeline begins at the first access time 422 and ends at the last access time 424. The timeline is then divided into a number of uniform intervals equal to the number of accesses in the access count 428. The process then continues to step 1612.

At step 1612, the process assumes that the amount of time between each change (identified by the change count 426) is uniform. Thus, the changes are evenly distributed on the timeline. The information necessary for the application of the Poisson process can be derived from the mapping of the changes to the timeline. The process continues from step 1612 to step 1614.

At step 1614, several variables are calculated from the historical information in each entry 410 for use in the training of the document probability distribution. The average time between accesses (intervals) is computed and stored as the interval time (DT). The number of intervals between changes is calculated (NC). The number of intervals in which a change occurred is calculated (C). A group of intervals between changes is termed a "no change chunk." Accordingly, the number of no change chunks (NCC) is calculated. And, finally, the length of time of each no change chunk (DTC) is calculated.

An event probability distribution for a no change event is computed in a step 1630. The event probability distribution includes a plurality of probabilities (EP[N]) that the event will occur at a given change rate (N) for the interval (DT) experienced with the no change events. Each probability EP[N] is computed using the Possion process: $EP[N]=e^{\wedge}(-R[N]*DT)$ where e is the transcendental constant used as the base for natural logarithms, R[N] is the rate of change and DT is the time interval of the event. At step 1632, the event probability distribution EP[N] calculated at step 1630 is passed to a process for training the document probability distribution for the no change events. The operations performed by the process to train the document probability distribution for each no change event are illustrated in detail in FIG. 16C1-2 and described below.

At a step 1633, an event probability distribution for a change event is computed. The event probability distribution includes a plurality of probabilities (EP[N]) that the event will occur at a given change rate (N) for the interval (DT) experienced with the change events. Each probability EP[N] is computed using the Possion process: $EP[N]=1-e^{\wedge}(-R[N]*DT)$. Alternatively, the event probability distribution may be calculated by taking the complement of each probability in the event probability distribution calculated for the no change events (as calculated in step 1630). At step 1634, the event probability distribution EP[N] calculated at step 1633 is passed to a process for training the document probability distribution for the change events. As mentioned above, the operations performed by the process to train the document probability distribution are illustrated in detail in FIG. 16C1-2 and described below.

At a step 1635, an event probability distribution for a no change chunk event is computed. The event probability distribution includes a plurality of probabilities (EP[N]) that the no change chunk event will occur at a given change rate (N) for the interval (DTC) interpolated for the no change chunk events. Each probability EP[N] is computed using the Possion process: $EP[N]=e^{\wedge}(-R[N]*DTC)$. At step 1634, the event probability distribution EP[N] calculated at step 1635 is passed to a process for training the document probability distribution for the no change chunk events, as illustrated in detail in FIG. 16C1-2.

In summary, at step 1632, the document probability distribution is trained for each no change interval. At step 1634, the document probability distribution is trained for each change interval. And at step 1638, the document probability distribution is trained for each no change chunk interval. The order that the events/intervals are trained in steps 1632, 1634, and 1638 is believed to be immaterial. Once the document probability distribution is completely trained, the process of FIG. 16A is done at step 1640. Those skilled in the art will appreciate that alternative statistical models may be employed to train the document probability distribution without deviating from the spirit of the invention.

FIG. 16B is a graphical representation of a timeline 1616 constructed in accordance with the process of FIG. 16A. Each pair of adjacent accesses 1618 define an interval 1620. The time of the first access, as stored in the history map 308, defines the first access time 422. The time of the last access, as stored in the history map 308, defines the last access time 424. The total access time (DTT) is the difference in time between the last access time 424 and the first access time 422. An average interval time DT is calculated by dividing the total number of intervals into the total access time DTT. Under the assumption that the changes recorded in the change count 426 occur at equal intervals during the accesses 1618, an exemplary three changes 1619 are evenly distributed among the intervals on the timeline 1616.

In general, an interval 1620 that does not contain a change event 1619 is considered to contain a no change event 1621. Since a longer interval period has a significant effect on the probability calculated by the Poisson equation, no change intervals occurring between adjacent change intervals may be grouped into "no change chunks" 1628. A no change chunk 1628 is a group of no change intervals, which may be used to calculate a chunk time interval (DTC). In cases where there is a remainder of no change intervals which cannot be evenly placed into a no change chunk 1620, the remainder intervals are treated as no change intervals 1621 and are used to train the document probability distribution separately. It should be appreciated that although one actual embodiment is described here for mapping events onto a timeline, there are many other, equally acceptable ways for mapping events onto a timeline. Accordingly, the present invention is not limited to the specific examples described here.

Figures 1, 16C:
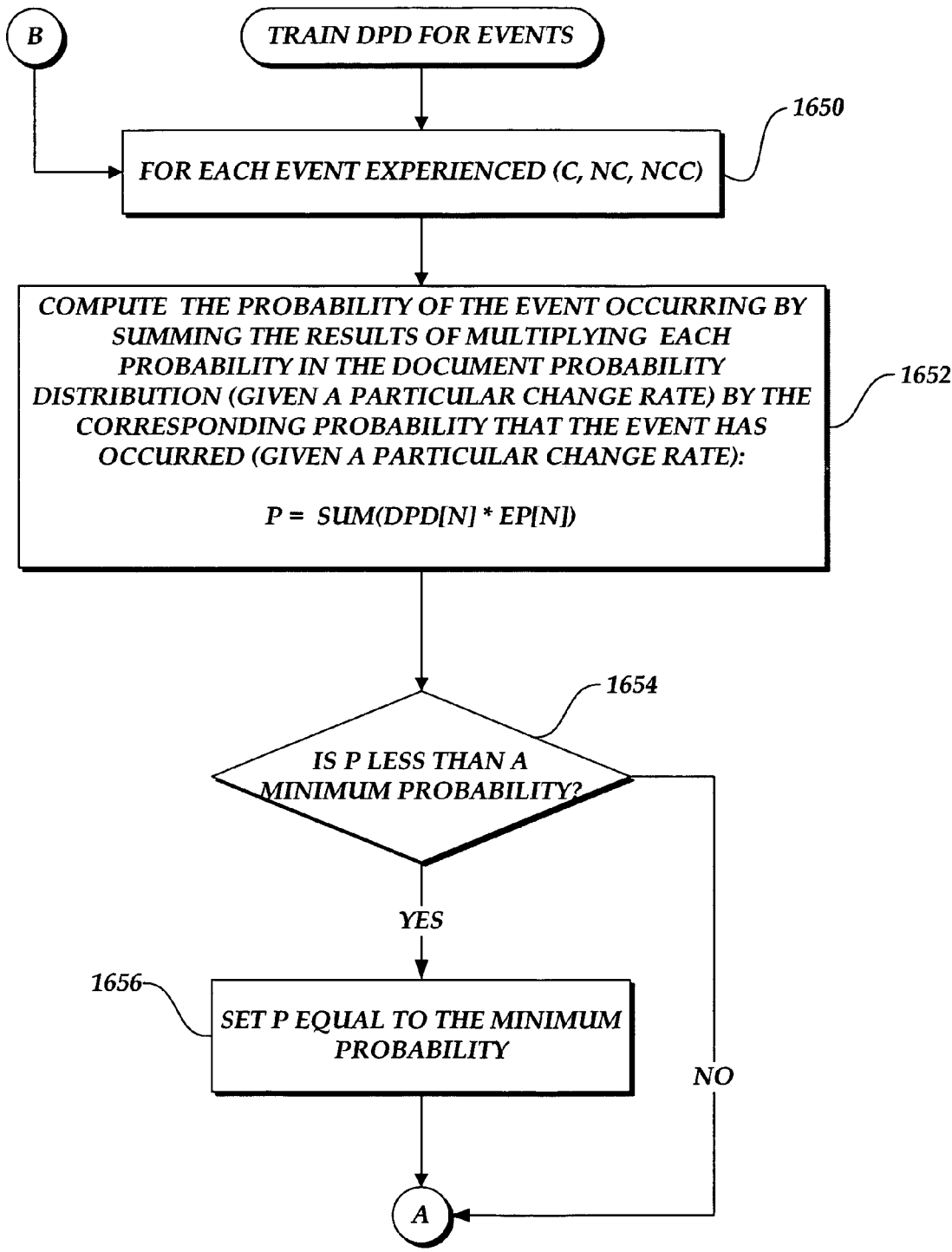
Figures 2, 16C:
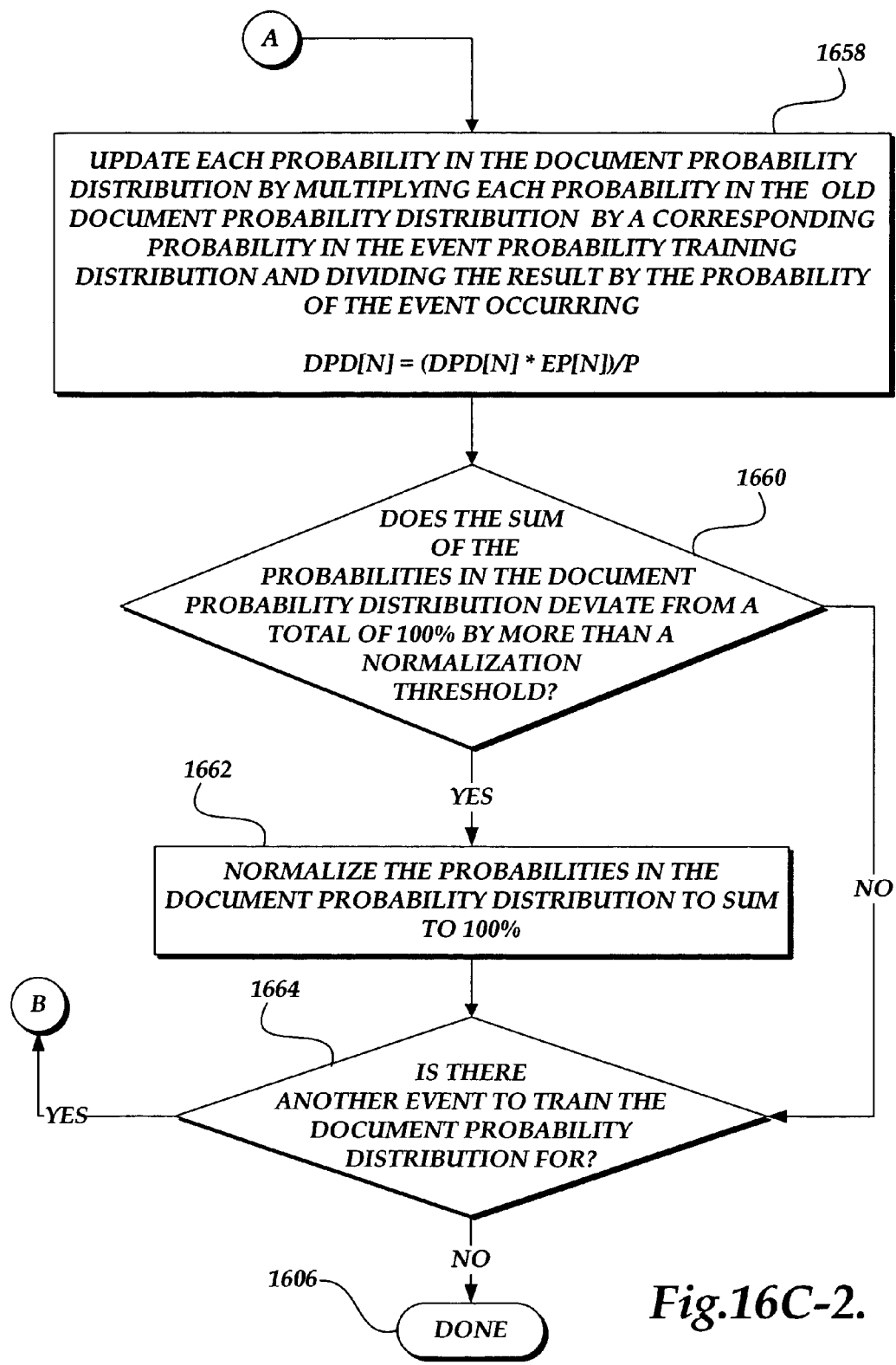

FIGS. 16C1-2 illustrate one exemplary process for training the document probability distribution for occurrence of an event for each passed event type (e.g., no change event, change event and no change chunk event). Beginning with step 1650, each occurrence of an event type (e.g., C, NC, NCC) is trained. At step 1652, the probability of the event occurring is computed by summing the results of multiplying each probability in the document probability distribution (given a particular change rate) by the corresponding probability that the event has occurred (given a particular change rate): i.e., P=SUM(DPD[i]*EP[i]). This probability P is checked against a minimum probability constant that is set by the system administrator. If the probability P is less than the minimum probability value, a decision step 1654 directs the process to set P to the minimum probability value in a step 1656.

Once checked by decision step 1654 and the value of P reset, if necessary, each probability in the document probability distribution is updated by multiplying each probability in the (old) document probability distribution by a corresponding probability in the event probability training distribution and dividing the result by the probability of the event occurring, i.e., DPD[N]=(DPD[N]*EP[N])/P.

The document probability distribution resulting from step 1658 is checked in a decision step 1660 for an adequate normalization, by determining if the sum of the probabilities in the document probability distribution deviate from a total of 100% by more than a predetermined normalization threshold constant. If the normalization threshold constant is exceeded, the document probability distribution is normalized in a step 1662.

At a step 1664, if there is another event to train the document probability distribution for, the process control is passed back to step 1650 (FIG. 16C-1). When all events have been trained for, the process is done 1666.

Figure 17:
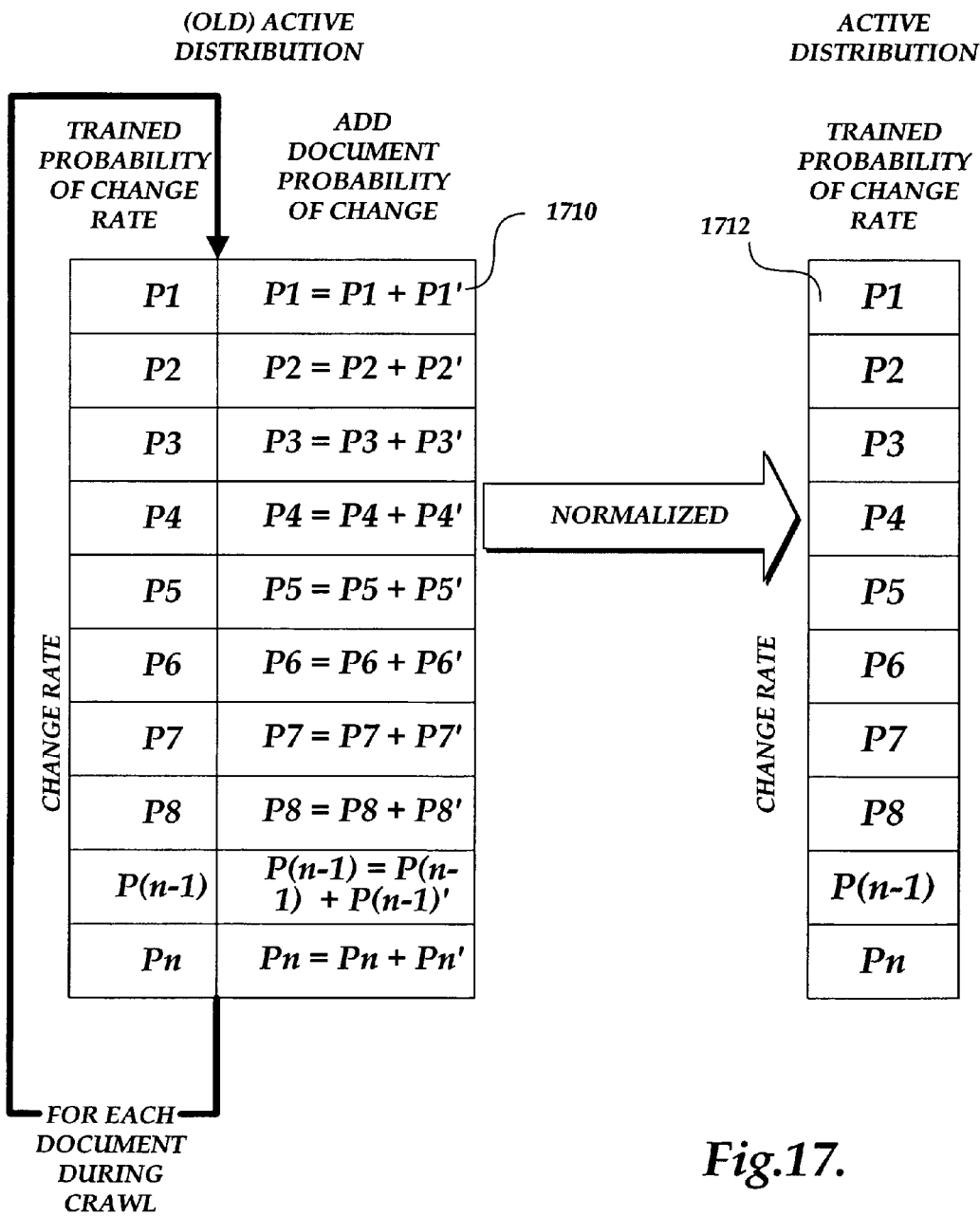
FIG. 17 is a block diagram illustrating the process of accumulating a training probability distribution in accordance with the present invention.

FIG. 17 illustrates the update of the training probability distribution 1710. As mentioned above, the training probability distribution is copied at the beginning of each current crawl from the active probability distribution and multiplied by a very small diversity constant that essentially sets the elements of the training probability distribution to zero. After each document probability distribution is calculated, each probability (Pn') in the document probability distribution is added to a corresponding probability (Pn) in the training probability distribution 1710. In this way, the training probability distribution aggregates the experience with all the documents probability distributions calculated for the adaptive incremental crawl. The training probability distribution 1710 becomes the active probability distribution for the next crawl once it is normalized 1714 to sum to zero.

Figure 18:
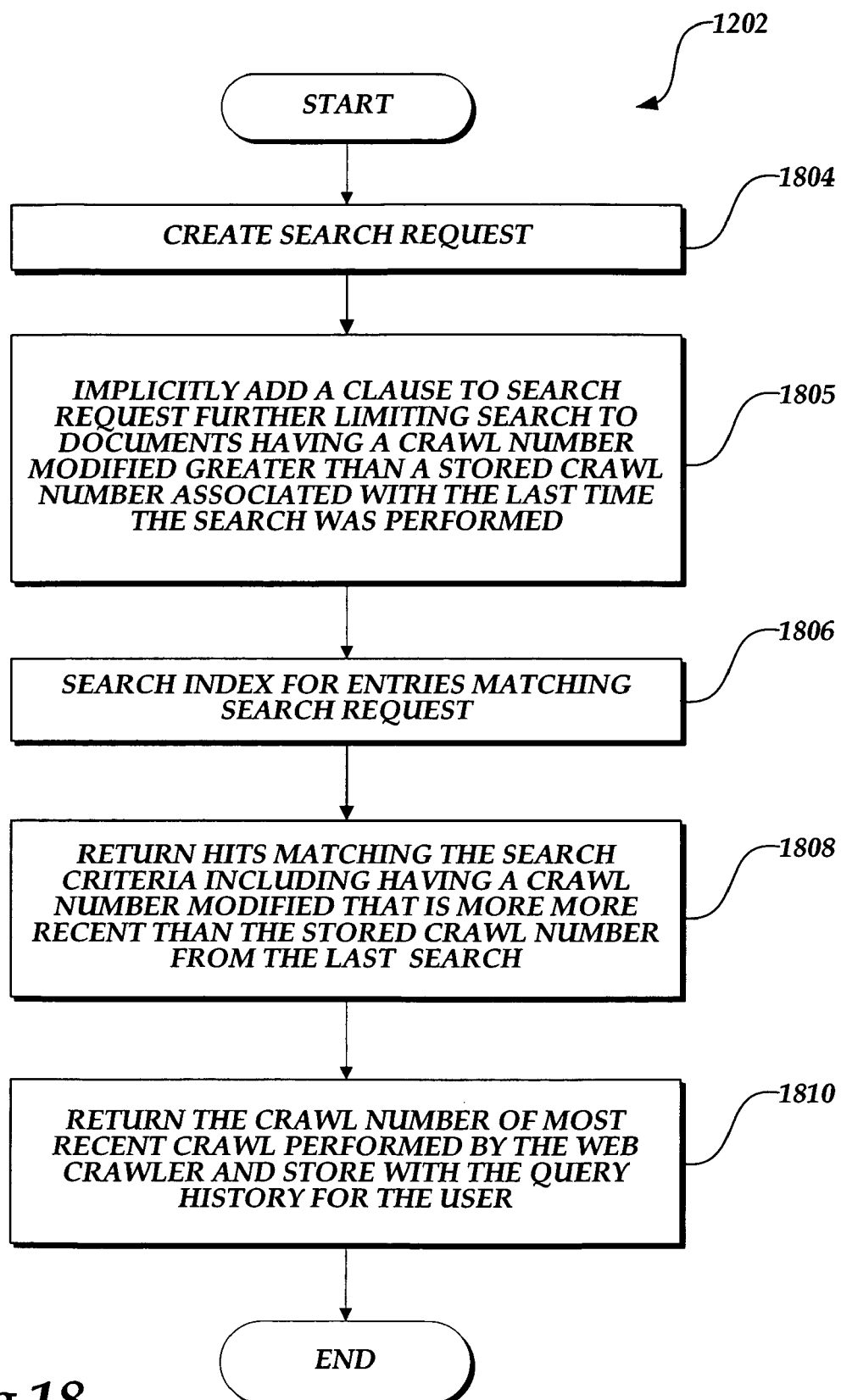
FIG. 18 is a flow diagram illustrating the process of performing a search for documents, in accordance with the present invention.

FIG. 18 illustrates an exemplary process 1802 for handling a Web search request in accordance with the present invention. At a step 1804, a search engine 230 (FIG. 2) receives a search request from a client application such as the Web browser 215. If the user wishes to receive only those documents that have changed in some substantive way since the last time the search request was run, the Web browser 215 (or other server or client application) sending the search request implicitly adds a clause to the search request that limits the search to only return those documents that have a crawl number modified that is greater than a stored crawl number associated with the last time the search request was processed by the search engine 230 (step 1205). The stored crawl number is retained in a search request history 250 (FIG. 2) and represents the crawl number of the most recent crawl that preceded the last time that the search request was processed.

At step 1806, the search engine 230 searches the index 210 for entries matching the specified criteria. The search engine 230 returns to the client computer 214 search results that include zero, one, or more "hits" at a step 1808. Each hit corresponds to a document that matches the search criteria. A "match" includes having a crawl number modified that is more recent than the stored crawl number specified in the search request. After the search is performed, at step 1810, the client application 215 implicitly asks the search engine 230 to return the crawl number of the most recently performed crawl, which it then stores with the search request in a search request history.

While the preferred embodiment of the invention has been illustrated and described, it will be appreciated that various changes can be made therein without departing from the spirit and scope of the invention as defined by the appended claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for selectively accessing a document during a current crawl of a server computer, the document being identified by a document address specification, the document having been retrieved during a previous crawl, the method comprising:
   (a) determining whether to access the document during the current crawl with the aid of a probabilistic model that is based on the probability that the document has changed since the previous crawl, wherein determining whether to access the document with the aid of a probabilistic model comprises computing a probability that the document has changed since the document was retrieved during the previous crawl, and wherein computing the probability that the document has changed comprises:
      (i) calculating, based on the experience with the document during a plurality of previous crawls, a discrete random variable distribution that includes a plurality of training probabilities, wherein the training probabilities are calculated using a Poisson process, the Poisson process including a Poisson equation ($e^{(-r*dt)}$) and a complementary Poisson equation ($1-e^{(r*dt)}$);
      (ii) selecting an active probability indicative of a proportion of documents in a plurality of documents that are changing at various change rates, the plurality of documents including the document;
      (iii) training the active probability to reflect experience with the document during the plurality of previous crawls; and
      (iv) using the trained active probability to compute the probability that the document has changed; and
   b) accessing the document if the determination produces an instruction indicative that the document at the document address specification should be accessed during the current crawl.

2. The method of claim 1, further comprising: selecting the probability that the document has changed from the previous crawl as the active probability in the current crawl; and repeating the method of claim 1 for the current crawl.

3. The method of claim 1, wherein training the active probability includes multiplying the active probability indicative of a change in the document by a training probability calculated using the probabilistic model.

4. The method of claim 1, further comprising:
   training a document probability distribution corresponding to the document address specification to reflect experience with the document during the plurality of previous crawls, the document probability distribution including a plurality of probabilities;
   determining from the document probability distribution a probability that the document has changed; and
   making a determination of whether to access the document in the current crawl based on the probability that the document has changed.

5. The method of claim 4, further comprising:
   calculating, based on the experience with the document during a plurality of previous crawls, a discrete random variable distribution that includes a plurality of training probabilities; and
   multiplying each probability in the document probability distribution by a corresponding training probability from the discrete random variable distribution.

6. The method of claim 1, wherein the experience with the document during the plurality of previous crawls is derived from historical information associated with the document address specification.

7. A computer-readable medium having computer-executable instructions for retrieving one document in a plurality of documents from a remote server, which when executed comprise:
   maintaining historical information associated with changes to the one document;
   initiating a crawl procedure for retrieving particular documents in the plurality of documents; and
   determining whether to access the one document from the remote server based on a probabilistic analysis of the historical information associated with the changes to the one document, said probabilistic analysis of the historical information being based on the probability that the one document has changed since a previous crawl, wherein the probabilistic analysis comprises computing a probability that the one document has changed since the one document was last retrieved from the remote server, and wherein computing the probability that the one document has changed since the one document was last retrieved from the remote server comprises, beginning with a probability that a pre-defined proportion of documents in the plurality of documents has changed, training the probability that the pre-defined proportion of documents has changed using the historical information associated with the one document to achieve the probability that the one document has changed, wherein computing the probability that the one document has changed also comprises: calculating, based on the experience with the document during a plurality of previous crawls, a discrete random variable distribution that includes a plurality of training probabilities, wherein the training probabilities are calculated using a Poisson process, the Poisson process including a Poisson equation ($e^{(-r*dt)}$) and a complementary Poisson equation ($1-e^{(-r*dt)}$).

8. The computer-readable medium of claim 7, further comprising making a random decision to retrieve the one document wherein the random decision is biased by the probability that the one document has changed.

9. The computer-readable medium of claim 8, wherein the random decision is further biased by a synchronization level configured to influence the random decision based on a predetermined degree of tolerance for not retrieving the one document if the document is likely to have changed.

10. The computer-readable medium of claim 8, wherein the random decision is made by a software routine adapted to simulate a flip of a coin.

11. The computer-readable medium of claim 7, wherein:
    the historical information associated with changes to the one document includes a time stamp for the one document, the time stamp being indicative of the time that the one document was last modified when the one document was last retrieved from the remote server; and
    the probabilistic analysis includes a comparison of the time stamp included in the historical information with another time stamp associated with the one document stored on the remote server.

12. The computer-readable medium of claim 11, further comprising:
    if the time stamp included in the historical information does not match the other time stamp associated with the one document stored on the remote server, identifying the one document for retrieval during the crawl procedure.

13. The computer-readable medium of claim 7, wherein:
the historical information associated with changes to the one document includes a hash value associated with the one document, the hash value being a representation of the one document; and
the probabilistic analysis includes a comparison of the hash value included in the historical information with another hash value calculated from information retrieved from the one document stored on the remote server.

14. The computer-readable medium of claim 13, if the hash value included in the historical information does not match the other hash value associated with the one document stored on the remote server, identifying the one document for retrieval during the crawl procedure.

* * * * *